(12) United States Patent
Jones, II et al.

(10) Patent No.: US 12,032,056 B2
(45) Date of Patent: Jul. 9, 2024

(54) UNIVERSAL SENSOR ASSEMBLY FOR VEHICLES

(71) Applicant: Lyft, Inc., San Francisco, CA (US)

(72) Inventors: Alfred Charles Jones, II, San Jose, CA (US); Marco Antonio Marroquín, San Mateo, CA (US); Kevin Danford, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 793 days.

(21) Appl. No.: 17/014,928

(22) Filed: Sep. 8, 2020

(65) Prior Publication Data
US 2022/0075057 A1    Mar. 10, 2022

(51) Int. Cl.
| | | |
|---|---|---|
| *G01S 13/931* | (2020.01) | |
| *B60R 11/04* | (2006.01) | |
| *G01S 7/02* | (2006.01) | |
| *G01S 13/86* | (2006.01) | |

(52) U.S. Cl.
CPC ............ *G01S 13/931* (2013.01); *B60R 11/04* (2013.01); *G01S 13/865* (2013.01); *G01S 13/867* (2013.01); *G01S 7/027* (2021.05); *G01S 2013/93273* (2020.01)

(58) Field of Classification Search
CPC ............. B60R 11/04; B60R 2011/0056; B60R 2011/004; G01S 13/931; G01S 17/931; G01S 17/86; G01S 13/86; G01S 13/862; G01S 13/865; G01S 13/867; G01S 7/4026; G01S 7/4972; G01S 2013/93273; G01S 7/027
See application file for complete search history.

(56) References Cited

U.S. PATENT DOCUMENTS

| | | | | |
|---|---|---|---|---|
| 3,858,774 A * | 1/1975 | Friis | ........................ | B60R 11/00 224/325 |
| 4,114,789 A * | 9/1978 | Blaylock | ................. | B60R 13/00 224/325 |
| 4,120,435 A * | 10/1978 | Eby | ...................... | B60Q 1/2611 224/322 |
| 9,409,528 B1 * | 8/2016 | Datz | .................... | B60Q 1/2611 |
| 10,040,403 B2 * | 8/2018 | McFadden | .............. | B60R 9/052 |
| 10,302,744 B1 * | 5/2019 | Krishnan | ................ | B60R 11/04 |
| 10,597,089 B2 * | 3/2020 | Ghannam | .............. | B62D 65/02 |
| 10,766,430 B2 * | 9/2020 | Frederick | ................ | B60R 11/00 |

(Continued)

*Primary Examiner* — Peter M Bythrow
(74) *Attorney, Agent, or Firm* — Baker Botts L.L.P.

(57) ABSTRACT

A universal sensor assembly for mounting on a vehicle is provided. The universal sensor assembly includes a sensor suite. The sensor suite includes a baseplate and a sensor being supported by the baseplate. The sensor including a field of view (FOV) associated with detecting objects within an environment surrounding the vehicle. The universal sensor assembly further includes a support structure. The support structure includes a set of detachable attachment mechanisms supporting the baseplate. The set of detachable attachment mechanisms is included on a rooftop of the vehicle at positions that are based on surface parameters associated with the rooftop and a support component supporting the baseplate. The one support component is disposed at a position on the rooftop that is based on the surface parameters so that the FOV of the sensor is unoccluded by any portion of the vehicle and the support structure.

20 Claims, 12 Drawing Sheets

(56) References Cited

U.S. PATENT DOCUMENTS

| | | | | |
|---|---|---|---|---|
| 2004/0099775 A1* | 5/2004 | Zheng | .................... | B60R 11/02 |
| | | | | 224/559 |
| 2008/0077327 A1* | 3/2008 | Harris | ................... | G01S 13/931 |
| | | | | 701/301 |
| 2018/0015886 A1* | 1/2018 | Frank | ...................... | B60R 11/04 |
| 2018/0257582 A1* | 9/2018 | Fan | ...................... | G01S 7/4813 |
| 2018/0262738 A1* | 9/2018 | Kapuria | ................ | H04N 23/51 |
| 2019/0003895 A1* | 1/2019 | Krishnan | ................ | B60R 11/04 |
| 2019/0315409 A1* | 10/2019 | Ghannam | ............... | B60R 11/00 |
| 2020/0023788 A1* | 1/2020 | Frederick | .................. | G01S 7/02 |
| 2020/0142426 A1* | 5/2020 | Gist, IV | ................. | G01S 17/86 |
| 2020/0156559 A1* | 5/2020 | Shiratsuki | ............. | F16M 11/10 |
| 2020/0169650 A1* | 5/2020 | Fellinger | ............. | G03B 17/561 |
| 2021/0026019 A1* | 1/2021 | Gahagan | ............... | G01S 17/931 |
| 2021/0286237 A1* | 9/2021 | Zeng | ...................... | F16F 15/06 |
| 2022/0048442 A1* | 2/2022 | Puchini | ................. | F16M 11/18 |
| 2022/0266763 A1* | 8/2022 | Huelsen | ............... | G01S 13/931 |
| 2022/0341751 A1* | 10/2022 | Abdelrahman | ......... | G01S 17/89 |

* cited by examiner

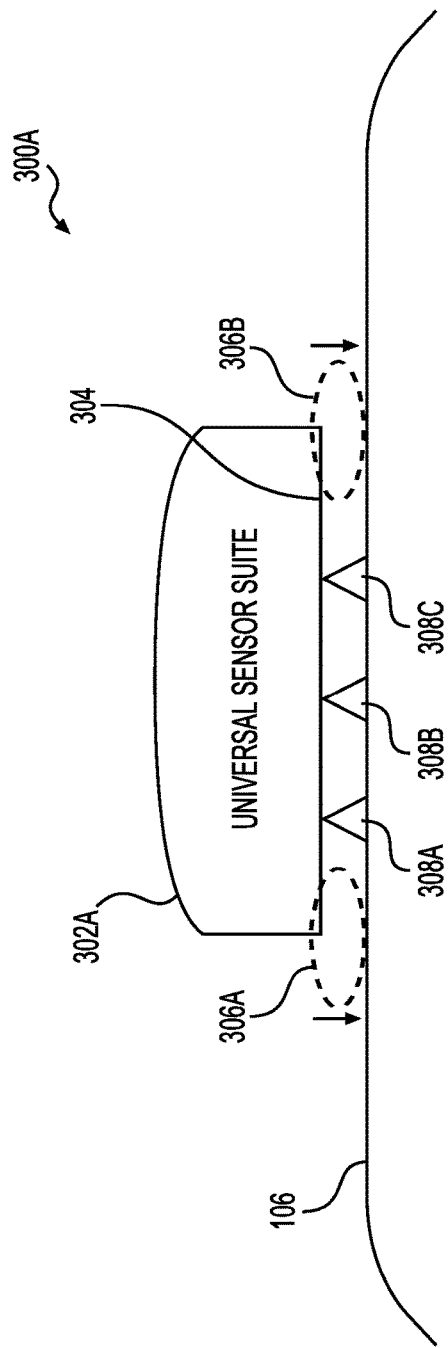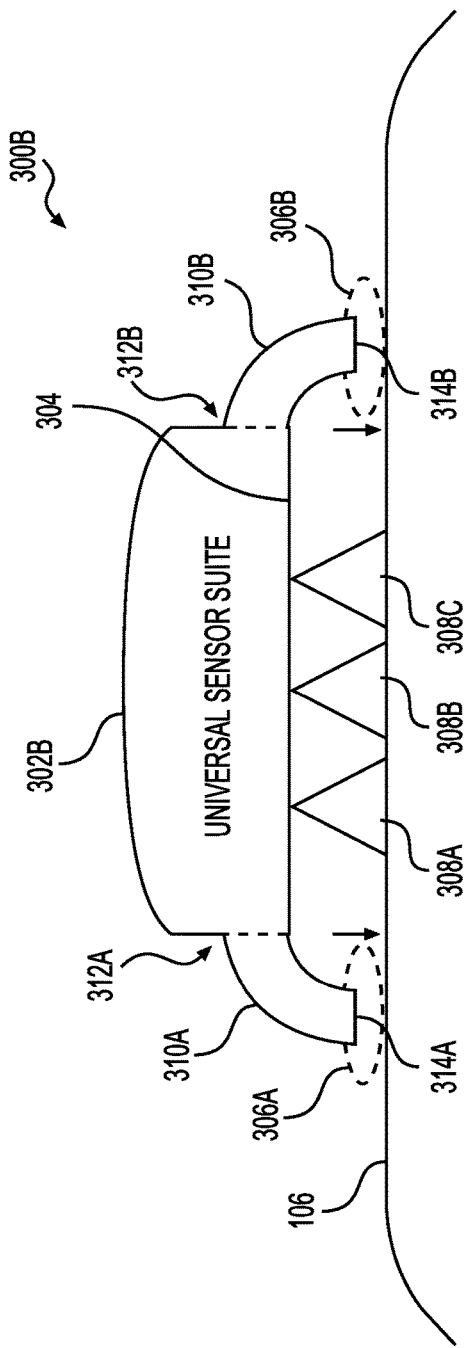

UNIVERSAL SENSOR ASSEMBLY FOR VEHICLES

TECHNICAL FIELD

This disclosure relates generally to a sensor assembly for vehicles, and, more specifically, to a universal sensor assembly for vehicles.

BACKGROUND

Autonomous or semi-autonomous vehicles may typically rely upon on a number of sensors (e.g., LiDARs, cameras, radars, and so forth) for determining an operational design domain (ODD), or an environment in which the vehicle may be optimally and safely deployed. For example, the particular sensors determined to be suitable for the ODD may be selected, disposed, calibrated, and fixed as part of a sensor setup to be installed onto the rooftop of the vehicle. Particularly, the sensor setup may act as the "eye" of the vehicle, continuously monitoring the environment surrounding the vehicle within some fixed sensor sight range. As such, many sensor setups may often include preassembled attachment structures that may specifically dedicated to a particular vehicle and particular rooftop design of that particular vehicle. However, in some instances, having the sensor setup being attached to the rooftop via attachment mechanisms (e.g., legs, supporting structures, stabilizing structures) with dimensions that are specific to only a particular vehicle model and manufacturer and rooftop design may prevent the sensor setup from being easily deployable or removable.

Further, because various types of vehicles (e.g., cars vs. trucks vs. minivans) may include differently designed rooftops, the sensor setup may be subject to a specific sensor recalibration for each vehicle and/or vehicle type, as the differently designed rooftops may disturb the mechanical properties (e.g., rigidity, flatness, stability, determinacy, and so forth) of the sensor assembly. Still further, even when the sensor setup includes a predesignated support structure for attachment mechanisms with dimensions that are specific to only a particular vehicle model and manufacturer and rooftop design, each differently designed rooftop would still be subject to its own specific sensor setup and predesignated support structure. Moreover, because these sensor setups may generally include only sensors with fixed sensor sight ranges, the sensors themselves may further limit the ability of these sensor setups from being easily deployable or removable for other, various types of vehicles since the sensor sight range may be also fixed to the particular dimensions of the vehicle and rooftop design. Such limitations may adversely impact the scalability of sensor setups, as well as exorbitantly increase inefficiencies in the production of these sensor setups. It may be thus useful to improve sensors and sensor setups for autonomous or semi-autonomous vehicles.

BRIEF DESCRIPTION OF THE DRAWINGS

FIGS. 3A and 3B illustrate a universal sensor suite and a universal sensor suite, respectively, for autonomous or semi-autonomous vehicles.

DESCRIPTION OF EXAMPLE EMBODIMENTS

Figure 1:
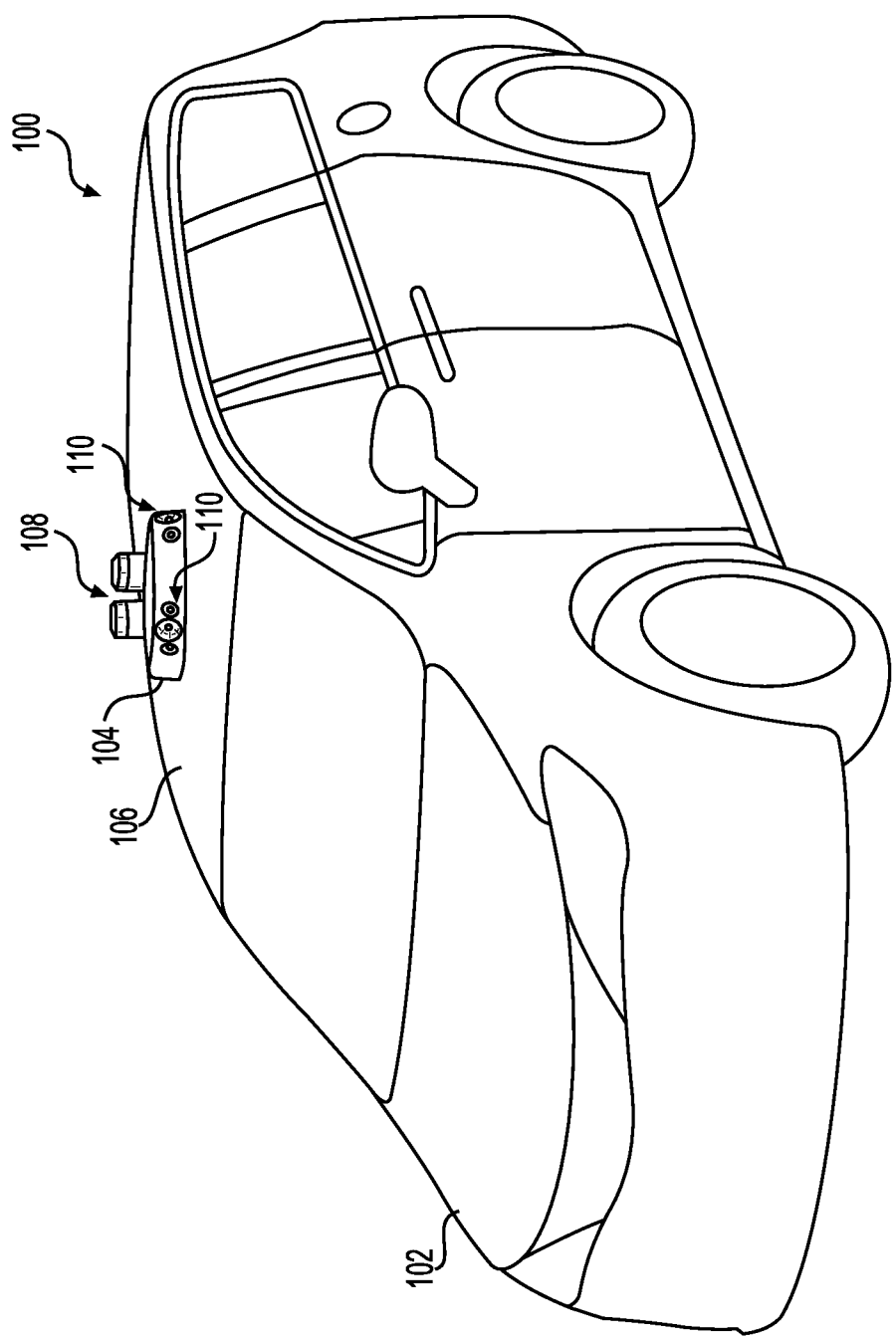
FIG. 1 illustrates an example autonomous or semi-autonomous vehicle environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The present embodiments relate to a universal sensor assembly for autonomous or semi-autonomous vehicles, and more particularly to a universal sensor assembly for increasing scalability and production efficiency for an entire fleet of various types of autonomous or semi-autonomous vehicles on which the universal sensor assembly is to be deployed. Autonomous or semi-autonomous vehicles may typically rely upon on a number of sensors (e.g., LiDARs, cameras, radars, and so forth) for determining an operational design domain (ODD), or an environment in which the vehicle may be optimally and safely deployed. For example, the particular sensors determined to be suitable for the ODD may be selected, disposed, and calibrated as part of a sensor assembly to be installed onto the rooftop of the vehicle. Particularly, the sensor assembly may act as the "eye" of the vehicle, continuously monitoring the environment surrounding the vehicle within some fixed sensor sight range. As such, many sensor assemblies may often include preassembled attachment structures that may specifically dedicated to a particular vehicle and particular rooftop design of that particular vehicle. However, in some instances, having the sensor assembly being attached to the rooftop via preassembled attachment structures (e.g., legs, supporting structures, stabilizing structures) with dimensions that are specific to only a particular vehicle model and manufacturer and rooftop design may prevent the sensor assembly from being easily deployable or removable for other, various types of vehicles.

Further, because various types of vehicles (e.g., cars vs. trucks vs. minivans) may include differently designed rooftops, the sensor assembly may be subject to a specific sensor recalibration for each vehicle and/or vehicle type, as the differently designed rooftops may disturb the mechanical properties (e.g., rigidity, flatness, stability, determinacy, and so forth) of the sensor assembly. Still further, even when the sensor assembly includes a predesignated support structure for attachment mechanisms with dimensions that are specific to only a particular vehicle model and manufacturer, each differently designed rooftop would still be subject to its own specific sensor assembly and predesignated support structure. Moreover, because these sensor setups may generally include only sensors with fixed sensor sight ranges, the sensors themselves may further limit the ability of these sensor assemblies from being easily deployable or removable for other, various types of vehicles since the sensor sight range may be also fixed to the particular dimensions of the vehicle and rooftop design. Such limitations may adversely impact the scalability of sensor setups, as well as exorbitantly increase inefficiencies in the production of these sensor setups. It may be thus useful to improve sensors and sensor setups for autonomous or semi-autonomous vehicles.

Accordingly, the present techniques include providing a universal sensor assembly for detachably coupling to vehicles by way of detachable attachment mechanisms or one or more removable support structures that are removable from the universal sensor assembly itself. Particularly, in some embodiments, the universal sensor assembly may include one or more detachable attachment mechanisms that may be connected to the perimeter (e.g., edges) of the undersurface of the universal sensor assembly, such that the one or more detachable attachment mechanisms may be positioned between the universal sensor assembly and the rooftop of a vehicle. For example, in some embodiments, the one or more detachable attachment mechanisms may include one or more industrial-grade suction devices (e.g., vacuum pump suction cups), industrial-grade magnetic devices, industrial-grade Velcro fasteners (e.g., tape, strip, and so forth), or one or more dissolvable adhesives. Furthermore, to ensure universality of the mechanical properties (e.g., rigidity, flatness, stability, determinacy, and so forth) irrespective of vehicle and/or vehicle type, the universal sensor assembly may also include one or more rigidly-designed, rigid support components that may be mounted toward a center portion of the undersurface of the universal sensor assembly.

In certain embodiments, as vibrations and/or other dynamic motions may be expected to occur during the operation and during a lifetime of the vehicle, the rigid support components may be designed with a predetermined rigidity (e.g., a predetermined Flexural modulus of elasticity or a predetermined Tensile modulus of elasticity), such that the universal sensor assembly may be allowed some vertical movement and/or vertical deformation (e.g., due to the detachable attachment mechanisms experiencing some vertical deformation or compression) as the vehicle travels without any disturbances to, for example, the rigidity (e.g., stiffness) of the universal sensor assembly, and, by extension, the sensor calibration of the sensors (e.g., LiDAR sensors, camera sensors) included as part of the universal sensor assembly. Specifically, the rigid support components may stiffen the universal sensor assembly, such that even if the detachable attachment mechanisms experiences some vertical deformation or compression, the vertical deformation or compression may be limited and mitigated by the rigidity (e.g., stiffness) provided by the rigid support components. Specifically, in some embodiments, the rigid support components may include a high-density material, such as a high-density rubber, a high-density foam, a high-density fiber, a high-density polymer, a high-density ceramic, a high-density composite, a high-density alloy, or other high-density material that may be utilized, for example, to at least partially counteract the compression or deformation of the one or more detachable attachment mechanisms in the downward direction so as to increase a rigidity with respect to the baseplate. That is, in some embodiments, the rigid support components may be provided to ensure that a relative motion between the universal sensor assembly and the vehicle remains fixed (e.g., such that the universal sensor assembly and the vehicle may move in a steady motion together and concurrently) during the operation of the vehicle. In other embodiments, the universal sensor assembly may also be configured to detachably couple (e.g., via suction devices, magnetic devices, Velcro fasteners, dissolvable adhesives, detachable connectors, and so forth) to a wide array of removable support structures that may be preconfigured to various types of vehicles (e.g., cars, trucks, minivans, semi-trailers, buses, and so forth). That is, the universal sensor assembly may, in some embodiments, include as fixed only the dedicated sensors for optimal perception capabilities. In this way, the universal sensor assembly may be switched from one type of vehicle (e.g., car) to another type of vehicle (e.g., truck) without the individual sensors of the universal sensor assembly having to be redesigned or recalibrated. For example, because the universal sensor assembly is modular and universal, the individual sensors (e.g., LiDAR sensors, camera sensors) may be calibrated to a common reference point with respect to a baseplate of the universal sensor assembly before being mounted on a vehicle. Thus, only the universal sensor assembly itself would be calibrated with respect to the particular vehicle type (e.g., car vs. truck vs. minivan vs. semi-trailer, etc.) based on, for example, vehicle height, position, angle, amount of vibration, vehicle dynamics of suspension, and so forth.

In certain embodiments, the present techniques may not only provide a universal sensor assembly that is both easily removable and deployable to various types of vehicles, but by additionally ensuring the universality of the mechanical properties (e.g., rigidity, flatness, stability, determinacy, and so forth) of the sensor assembly, a number of technical advantages with respect to scalability and efficiency of production may also be achieved. For example, because the universal sensor assembly may be free of attachment mechanisms (e.g., legs, supporting structures, stabilizing structures) with dimensions that are specific to only a particular vehicle model and manufacturer and rooftop design, and further allows for universal and/or one-off sensor calibration, the deployment of the universal sensor assembly to various types of vehicles (e.g., cars, trucks, minivans, and so forth) may be performed quickly and efficiently utilizing, for example, one or more gantry cranes or other similar mechanisms.

For example, in certain embodiments, a gantry crane configured to position the universal sensor assembly onto the rooftops of various types of vehicles (e.g., cars, trucks, minivans, and so forth) may determine the most optimal place and position (e.g., frontward, rearward, or central) on the rooftop for the type of vehicle to achieve maximum sensor field of view (FOV). The gantry crane may then deploy the universal sensor assembly onto the rooftop of the vehicle by way of the detachable attachment mechanisms. In certain embodiments, the universal sensor assembly may include, for example, detachable attachment mechanisms that are nonspecific to the vehicle type (e.g., car vs. truck vs. minivan vs. semi-trailer, etc.), model, and manufacturer vehicle, and thus the universal sensor assembly may itself be calibrated with respect to the particular vehicle based on vehicle physical dimensions, such as the vehicle and rooftop height (e.g., measured from rooftop to ground), vehicle and rooftop width, vehicle and rooftop position, rooftop angle, amount of vibration, vehicle dynamics of suspension, vehicle and rooftop shape, a vehicle and rooftop contour, vehicle and rooftop flatness, vehicle and rooftop style, and so forth that may be captured and analyzed by one or more cameras and a control system of the gantry crane as the vehicle approaches the gantry crane. This allows the gantry crane to position and place the universal sensor assembly onto the rooftop in a manner that would provide the most accurate perception and maximized FOV. Specifically, by determining the vehicle and rooftop physical dimensions, an unoccluded, sweeping 360° FOV and sensor coverage may be achieved for all vehicles and all types of vehicles on which the universal sensor suite may be mounted upon. This may further markedly increase scalability and production efficiency, for example, for an entire fleet of various types of vehicles on which the universal sensor assembly is to be deployed.

In certain embodiments, to further increase scalability and production efficiency, for example, for an entire fleet of various types of vehicles on which the universal sensor assembly is to be deployed, one or more sensors that may be included as part of the universal sensor assembly may be adjustable to cover multiple sensor sight ranges based on, for example, vehicle velocity and/or vehicle and vehicle rooftop physical dimensions. For example, in certain embodiments, the universal sensor assembly may include one or more adjustable LiDAR sensors. In other embodiments, the universal sensor assembly may include any of various adjustable sensors, such as adjustable camera sensors, adjustable IMU sensors, adjustable radar sensors, or other similar adjustable sensors. In certain embodiments, the LiDAR sensor may include a pivotable relative angle. For example, the adjustable LiDAR sensor may be mounted to the pivoting surface, in which the relative angle of the pivoting surface may be controlled by a linear actuator. In some embodiments, the linear actuator may include, for example, a hydraulic linear actuator, pneumatic linear actuator, an electromechanical actuator, or other linear actuator that may be suitable for mechanically operating to cause the adjustable LiDAR sensor to pivot from a starting position corresponding to a vertical angle position (e.g., at angle of approximately 90° and corresponding to a particular sensor sight range) to an acute angle position (e.g., corresponding to another particular sensor sight range) at decreased velocities. For example, in one embodiment, the adjustable LiDAR sensor may pivot from the vertical angle position to an acute angle position when the vehicle reaches a velocity of approximately 25 miles per hour (mph) or lower, for example.

In certain embodiments, as the velocity of the vehicle increases, the linear actuator may cause the adjustable LiDAR sensor to pivot back to the vertical angle position (e.g., at angle of approximately 90° and corresponding to a particular sensor sight range) at increased velocities. For example, in one embodiment, the adjustable LiDAR sensor may pivot back to the vertical angle position when the vehicle reaches a velocity of approximately 60 mph or higher, for example. For example, in other embodiments, the linear actuator may also be configured to mechanically operate to cause the adjustable LiDAR sensor to pivot in accordance with vehicle velocities over a continuous range of relative angles (e.g., over relative angles from 0° to 90° that varies along with changes in vehicle velocity). In this way, the adjustable LiDAR sensor may cover all of the sight ranges in an efficient manner. Moreover, because the adjustable LiDAR sensor may include a mechanical operation (e.g., as opposed to an electronic and/or computer-based operation), the adjustable LiDAR sensor may exhibit faster response times, and thus increase the overall safety response of the vehicle. Additionally, in some embodiments, the adjustable LiDAR sensor may be adjusted based partly on the vehicle and vehicle rooftop physical dimensions (e.g., adjustment of the pivoting angle range of the adjustable LiDAR sensor in view of one or more vehicle rooftop physical dimensions).

In certain embodiments, the adjustable LiDAR sensor may also include a failsafe mechanism (e.g., hydraulic ball and screw mechanism on a first end of the pivoting surface of the adjustable LiDAR sensor and a compression spring on a second end of the pivoting surface of the adjustable LiDAR sensor) to cause the adjustable LiDAR sensor to tilt permanently into the acute angle position to perceive objects that may become apparent directly in front of the vehicle, for example, in the case of a misoperation or operator-determined temporary suspension of the pivoting mechanism of the adjustable LiDAR sensor. This may allow the adjustable LiDAR sensor to perceive near-field objects (e.g., typically corresponding to times the vehicle is operating at velocities below 25 mph and being suited for perceiving objects within a distance of approximately 50 m) even in the case in which, for example, a misoperation or an operator-determined temporary suspension of the pivoting mechanism of the adjustable LiDAR sensor occurs. Thus, in accordance with the presently disclosed techniques, the universal sensor assembly may include one or more sensors that may be adjustable to cover multiple sensor sight ranges based on, for example, vehicle velocity and/or vehicle and vehicle rooftop physical dimensions. This may further markedly increase scalability and production efficiency, for example, for an entire fleet of various types of vehicles on which the universal sensor assembly is to be deployed.

In certain embodiments, to further reduce complexity and facilitate sensor data and vehicle data collection by a central system (which may also increase scalability and data management efficiency with respect to an entire fleet of various types of vehicles), although not illustrated, a compute system of the vehicle 102 may include one or more communication ports (e.g., universal synchronous asynchronous receiver transmitter (USART) port, serial peripheral interface (SPI) port, ethernet port, universal serial bus (USB) port, local interconnect network (LIN) port, and so forth) in which one or more portable storage devices may be installed thereinto. For example, in some embodiments, the one or more portable storage devices may include, for example, a solid-state memory device (e.g., NAND flash) that may be installed into the communication ports to record or download vehicle data and sensor data of the vehicle 102 locally (e.g., at the vehicle 102) until indicating that its storage capacity is reached. The memory device may be then manually removed and replaced (e.g., by instructing and/or driving the vehicle 102 to a centralized location and replacing the memory device with another memory device), thus eliminating any cumbersome tasks to inefficiently transmit the vehicle data over wireless networks. This may increase scalability and data management efficiency for an entire fleet of various types of vehicles.

Indeed, while the present techniques may be discussed henceforth primarily with respect to autonomous or semi-autonomous vehicle types such as minivans, caravans, multi-purpose vehicles (MPVs), sport utility vehicles (SUVs), crossover utility vehicles (CUVs), and recreational vehicles (RVs), it should be appreciated that the present techniques may be applied to any of various types of autonomous or semi-autonomous vehicles (e.g., cars, trucks, vans, buses, semi-trailer trucks, trains, trams, cable cars, tractors, forklifts, construction vehicles, farming vehicles, unmanned vehicles, drones, scooters, aircrafts, watercrafts, spacecrafts, and so forth). As used herein, "calibration" or "sensor calibration" may refer to a process utilized to inform an autonomous or semi-autonomous vehicle of the manner in which a number of sensors may be positioned on or about the vehicle, and to bring the information captured (e.g., raw sensor data) by each of the number of sensors into a common coordinate frame (e.g., a measurement reference frame).

For example, in some embodiments, performing "calibration" or "sensor calibration" may include deploying one or more machine learning (ML) algorithms that may allow, for example, the autonomous or semi-autonomous vehicle to understand the manner in which the environment appears from the perspective of each individual sensor and/or each individual set of similar sensors. Similarly, as used herein, "data fusion" or "sensor data fusion" may refer to a sensor coverage, communication, reference, synchronization, and redundancy modality that may be established with respect to each individual sensor and/or each individual set of similar sensors disposed on an autonomous or semi-autonomous vehicle, such that the information captured (e.g., with respect to the vehicle itself and/or the environment in which the vehicle is operating) by each individual sensor or each individual set of similar sensors may be coalesced to generate increasingly accurate determinations (e.g., alerts, control actions) based thereon. For example, in some embodiments, performing "data fusion" or "sensor data fusion" may include deploying one or more deep learning algorithms to perform perception, mapping, localization, and control (e.g., based on the calibrated sensor data) of an autonomous or semi-autonomous vehicle.

Furthermore, as used herein, "modular" may refer to a system designated to include one or more subcomponents or subunits of standardized and purposeful size, design, construction, arrangement, positioning, configuration, disposition, calibration, universality, etc., such that the one or more subcomponents or subunits may be suitably arranged and/or fitted together onto a singular support medium in a myriad of ways and may each be interchangeable (e.g., swappable) with each other and/or with other similar subcomponents or subunits. For example, as used herein, a "modular" sensor assembly may include a sensor assembly including a baseplate, which may include one or more individually designated calibration locations for respective sensors or sets of sensors (e.g., sensors or sets of sensors of various modalities) and a retrofittable design, such that any of the sensors may be swapped onto the baseplate or swapped off from the baseplate without necessarily having to perform a recalibration (e.g., since all of the sensors are pre-calibrated to a common calibration point at least partially imparted by the baseplate). Further, additional sensors (e.g., of various modalities) that were not already part of the "modular" sensor assembly may also be added onto the baseplate without necessarily having to perform a recalibration.

Still further, as used herein, "universal" may refer to a system designated to include a singular kit of standardized and purposeful size, design, construction, arrangement, positioning, configuration, disposition, calibration, universality, etc., such that the "universal" sensor assembly may itself be interchangeable, such that the complete "universal" sensor assembly may be swapped onto a vehicle or swapped off from a vehicle without any of the sensors necessarily having to be recalibrated. That is, the "universal" sensor assembly may include a universal sensor setup that includes sensors that may be calibrated either on a vehicle or calibrated apart from a vehicle. In this way, the "universal" sensor assembly, as provided herein, may vastly increase scalability. For example, only the "universal" sensor assembly itself would be calibrated to the particular vehicle type (e.g., car vs. truck vs. minivan vs. bus vs. semi-trailer, etc.) based on, for example, vehicle and rooftop height, vehicle and rooftop width, vehicle and rooftop position, rooftop angle, amount of vibration, vehicle dynamics of suspension, vehicle and rooftop shape, a vehicle and rooftop contour, vehicle and rooftop flatness, vehicle and rooftop style, and so forth. For example, the "universal" sensor assembly may be configured and fitted together as a kit to be deployed to various types of vehicles without sacrificing the functionality of the "universal" sensor assembly. Thus, "universal" may convey that no aspects of the "universal" sensor assembly may be modified in order to render the "universal" sensor assembly physically suitable for the various types of vehicles. Indeed, "universal" may further convey that only secondary or auxiliary components (e.g., not part of the "universal" sensor assembly itself) may be utilized to render the "universal" sensor assembly physically suitable for the various types of vehicles.

With the forgoing in mind, it may be useful to describe an example autonomous or semi-autonomous vehicle environment 100, as illustrated by FIG. 1. As depicted by FIG. 1, a vehicle 102 may include, for example, an autonomous or semi-autonomous vehicle such as a minivan, a caravan, a multi-purpose vehicle (MPV), a sport utility vehicle (SUV), a crossover utility vehicle (CUV), or a recreational vehicle (RV) that may be operated within the environment 100 (e.g. a real-world environment). As further depicted by FIG. 1, the vehicle 102 may include a universal sensor assembly 104, in accordance with the presently disclosed embodiments. In certain embodiments, the universal sensor assembly 104 may include a rooftop sensor setup that may be utilized, for example, to capture information about the vehicle 102 and/or environment 100 for performing perception (e.g., the resolving of certain agents that may be present within the environment 100 or vicinity of the vehicle 102 such as other vehicles, pedestrians, bicyclists, wildlife, vegetation, or any of various other potential moving and/or stationary obstructions), mapping (e.g., precise location information of the environment 100 such as road lanes, road lane boundaries, intersections, traffic lights, traffic signs, detours, road elevations, road declinations, railroad crossings, tramway tracks, speed bumps, and so forth), localization (e.g., the precise location of the vehicle 102 itself within the environment 100), and control (e.g., driving operations) of the vehicle 102. As depicted, in certain embodiments, the universal sensor assembly 104 may include a sleek and minimalistic design, such that the universal sensor assembly 104 may be positioned compactly on the rooftop of the vehicle 102 with only a minimal footprint.

Although not illustrated, it should be appreciated that, in addition to the universal and universal sensor assembly 104 disposed onto the rooftop 106 of the vehicle 102, in other embodiments, the vehicle 102 may also include additional sensors that may be disposed in other places of the vehicle 102. For example, in some embodiments, the vehicle 102 may include additional sensors that may be disposed, for example, along or underneath the front and back fenders of the vehicle 102, along the front grille of the vehicle 102, along a backside of the vehicle 102, along or underneath the side panels of the vehicle 102, along or underneath the chassis of the vehicle 102, inside a cockpit area of the vehicle 102, inside a payload area of the vehicle 102, within one or more wheel wells of the vehicle 102, and/or in various other places of the vehicle 102 that may be suitable for disposing sensors to collect information about the vehicle 102 and/or the environment 100.

In certain embodiments, the universal sensor assembly 104 may also include a baseplate on which a set of one or more LiDAR sensors 108 and a set of camera sensors 110 may be mounted. Specifically, in some embodiments, the baseplate may impart a common coordinate frame (e.g., a singular measurement reference frame) by which a sensor calibration and/or sensor data fusion of the set of one or more LiDAR sensors 108 and a set of camera sensors 110 may be performed based thereon, and, in some embodiments, independently from the vehicle 102. In some embodiments, the set of one or more LiDAR sensors 108 and a set of camera sensors 110 may be arrangeably coupled to the baseplate to provide a common coordinate frame (e.g., a measurement reference frame) for the set of one or more LiDAR sensors 108 and a set of camera sensors 110. Specifically, the baseplate may include one or more other individually designated locations (e.g., determined based on one or more structural analyses and sensor FOV optimization analyses) for the set of one or more LiDAR sensors 108 and a set of camera sensors 110 that may be selected to both maximize sensor coverage (e.g., FOV) and to balance a weight distribution of the universal sensor assembly 104. In certain embodiments, based on the common coordinate frame imparted by the baseplate, a calibration of the set of one or more LiDAR sensors 108 and a set of camera sensors 110 may be performed prior to mounting the universal sensor assembly 104 onto the rooftop 106 of the vehicle 102 (e.g., independently of the vehicle 102). For example, in some embodiments, prior to disposing the modular sensor assembly onto the rooftop 106 of the vehicle 102, the set of one or more LiDAR sensors 108 and a set of camera sensors 110 may be calibrated to a target calibration position corresponding to the common coordinate frame (e.g., a measurement reference frame) as imparted by the baseplate. However, while the set of one or more LiDAR sensors 108 and the set of camera sensors 110 of the universal sensor assembly 104 may be calibrated to a common coordinate frame when the universal sensor assembly 104 includes sensors of multiple sensor modalities, it should be appreciated that, in some embodiments, the universal sensor assembly 104 may include only one sensor and/or one sensor modality (e.g., only the set of one or more LiDAR sensors 108 or only the set of camera sensors 110) and thus would be calibrated alone or with respect only to other sensors of the same sensor modality.

In certain embodiments, to further reduce complexity and facilitate sensor data and vehicle data collection by a central system, although not illustrated, a compute system of the vehicle 102 may include one or more communication ports (e.g., universal synchronous asynchronous receiver transmitter (USART) port, serial peripheral interface (SPI) port, ethernet port, universal serial bus (USB) port, local interconnect network (LIN) port, and so forth) in which one or more portable storage devices may be installed thereinto. For example, in some embodiments, the one or more portable storage devices may include, for example, a solid-state memory device (e.g., NAND flash) that may be installed into the communication ports to record or download vehicle data and sensor data of the vehicle 102 locally (e.g., at the vehicle) until indicating that its storage capacity is reached. The memory device may be then manually removed and replaced (e.g., by instructing and/or driving the vehicle 102 to a centralized location and replacing the memory device with another memory device), thus eliminating any cumbersome tasks to inefficiently transmit the vehicle data over wireless networks. This may increase scalability and data management efficiency for an entire fleet of various types of vehicles 102.

Figure 2A:
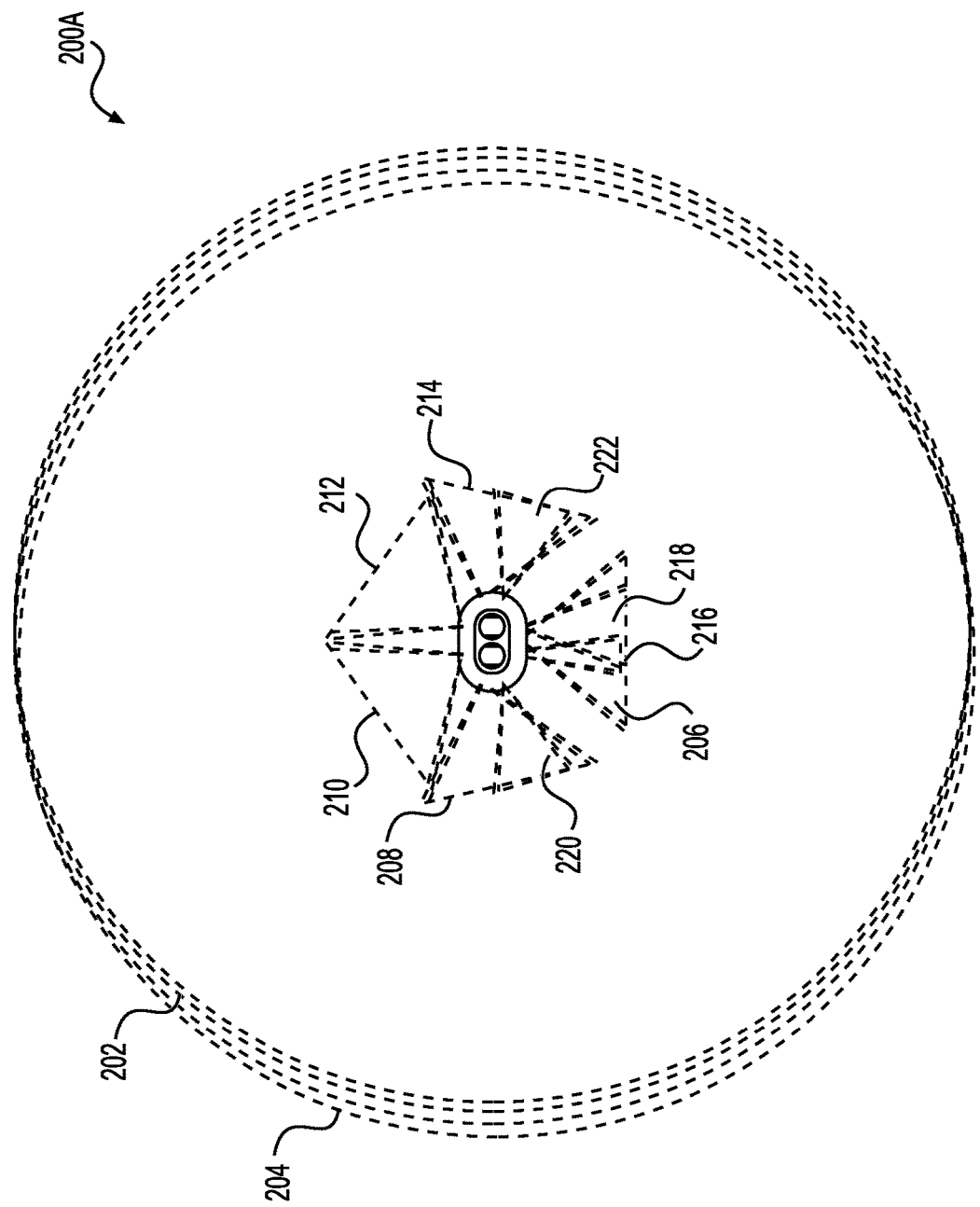
FIGS. 2A and 2B illustrate respective aerial-view diagrams of embodiments of sensor coverages.
Figure 2B:
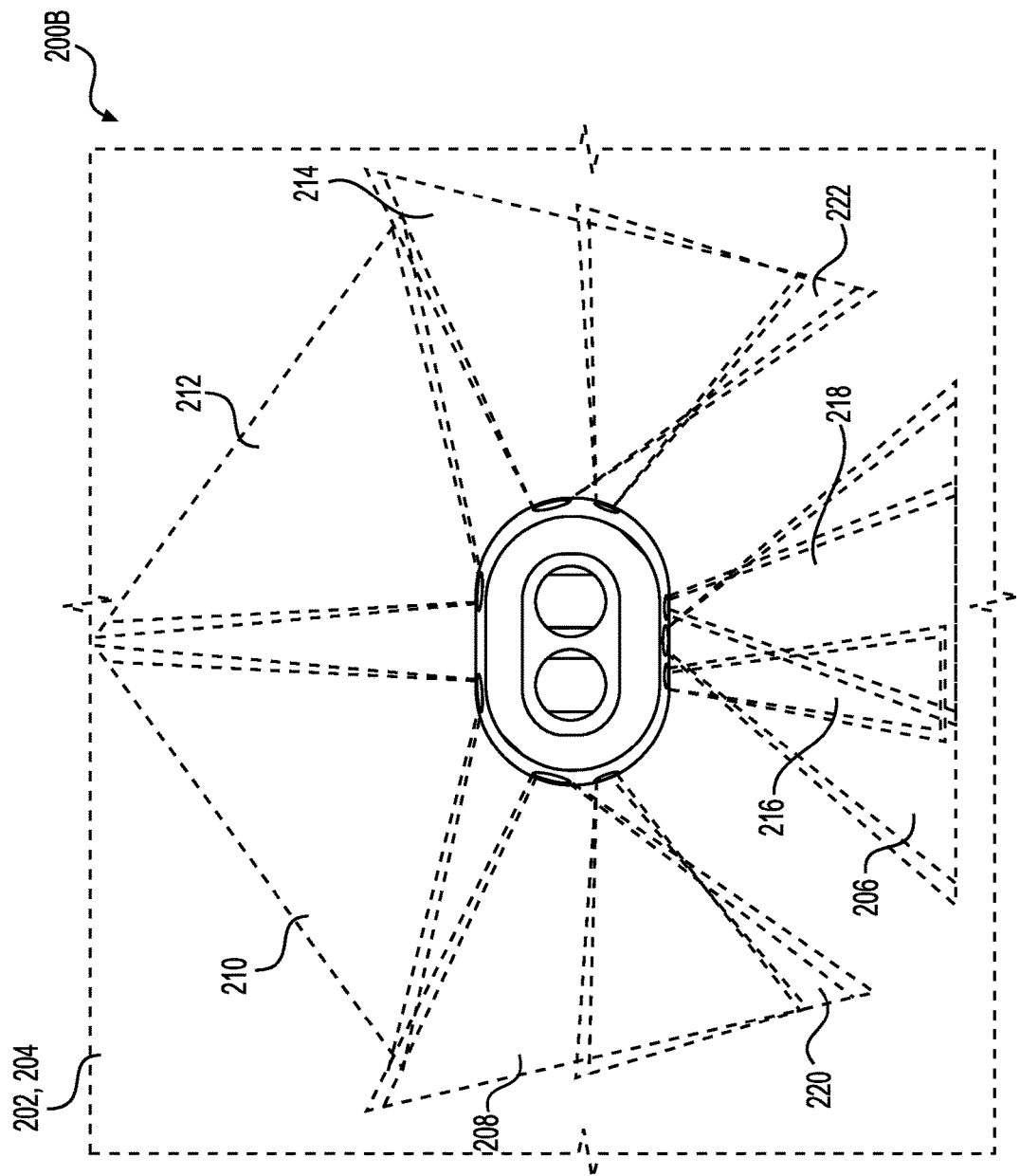

FIGS. 2A and 2B illustrate respective aerial-view diagrams 200A and 200B of embodiments of the sensor coverages of the set of one or more LiDAR sensors 108 and the sight coverages of the set of camera sensors 110 that may serve as a base model sensor FOV for various types of vehicles 102, in accordance with the presently disclosed embodiments. Specifically, the aerial-view diagrams 200A and 200B of embodiments of the sensor coverages correspond to the sensor FOVs for the set of one or more LiDAR sensors 108 and the set of camera sensors 110 of the universal sensor assembly 104 as discussed above with respect to FIG. 1. However, while the aerial-view diagrams 200A and 200B of embodiments of the sensor coverages correspond to the sensor FOVs for the set of one or more LiDAR sensors 108 and the set of camera sensors 110 of the universal sensor assembly 104, it should be appreciated that, in some embodiments, the universal sensor assembly 104 may include only one sensor and/or one sensor modality (e.g., only the set of one or more LiDAR sensors 108 or only the set of camera sensors 110) and its respective FOV. As depicted, the sensor coverages 202 and 204 corresponding to the set of one or more LiDAR sensors 108 may include an unoccluded, sweeping 360° FOV of, for example, the environment 100 surrounding the vehicle 102. In certain embodiments, the set of one or more LiDAR sensors 108 may operate in conjunction for purposes of redundancy, and thus the sensor coverage 202 and the sensor coverage 204 may, in some embodiments, include identical and/or nearly identical views of the environment 100 surrounding the vehicle 102, for example. As further depicted, the sight coverages 206, 208, 210, 212, and 214 may correspond to wide cameras of the set of camera sensors 110, and thus may be suitable for capturing, for example, the widest possible view of the environment 100 per image frame. On the other hand, the sight coverages 216 and 218 may correspond to a set of traffic cameras of the set of camera sensors 110, and may thus capture, for example, only specific objects (e.g., traffic, traffic lights, traffic signals, traffic signs).

In one embodiment, for the purposes of redundancy and precision, the sight coverages 216 and 218 may include at least some overlap with the sight coverage 206 (e.g., wide FOV), as illustrated. Similarly, the sight coverages 220 and 222 may respectively correspond to a set of narrow cameras of the set of camera sensors 110, and thus may be suitable for capturing, for example, specific objects and/or aspects of the environment 100 with the highest possible precision and resolution per image frame. In another embodiment, for the purposes of redundancy and precision, the sight coverages 220 and 222 may include at least some overlap with the sight coverages 208 and 214 (e.g., wide FOV), respectively. It should be appreciated that while one or more of the sight coverages 206-222 may include at least some overlap with each other, none of the sight coverages 206-222 may overlap and/or interfere with the sensor coverages 202 and 204. In certain embodiments, because the set of one or more LiDAR sensors 108 may be mounted at a height higher than that of the set of camera sensors 110, any possible occlusion and/or interferences between the sensor coverages 202 and 204 and the sight coverages 206-222 may be precluded. In certain embodiments, in accordance with the presently disclosed techniques, the sensor coverages 202 and 204 corresponding to the set of one or more LiDAR sensors 108 and the sight coverages 206-222 corresponding to the set of camera sensors 110 may include an unoccluded, sweeping 360° FOV of, for example, the environment 100 surrounding the vehicle 102 regardless of the different types of vehicles 102 the universal sensor assembly 104 may be mounted upon.

FIGS. 3A and 3B illustrate a universal sensor assembly 300A and a universal sensor assembly 300B, respectively, for autonomous or semi-autonomous vehicles, in accordance with the presently disclosed embodiments. In certain embodiments, a universal sensor suite 302A may include a baseplate 304. For example, in certain embodiments, the baseplate 304 may include, for example, a stiffened and flat metal (e.g., aluminum, aluminum alloy, anodized aluminum, copper, copper-clad invar, and so forth) baseplate that may be utilized as a support structure for the set of one or more LiDAR sensors 108 and the set of camera sensors 110 to impart a common coordinate frame for the set of one or more LiDAR sensors 108 and the set of camera sensors 110. Specifically, in some embodiments, the baseplate 304 may impart a common coordinate frame (e.g., a singular measurement reference frame) by which a sensor calibration and/or sensor data fusion of the set of one or more LiDAR sensors 108 and the set of camera sensors 110 may be performed based thereon. As previously noted above with respect to FIGS. 1, 2A, and 2B, while the set of one or more LiDAR sensors 108 and the set of camera sensors 110 of the universal sensor suite 302A, 302B may be calibrated to a common coordinate frame when the universal sensor suite 302A, 302B includes sensors of multiple sensor modalities, it should be appreciated that, in some embodiments, the universal sensor suite 302A, 302B may include only one sensor and/or one sensor modality (e.g., only the set of one or more LiDAR sensors 108 or only the set of camera sensors 110) and thus would be calibrated alone or with respect only to other sensors of the same sensor modality.

In certain embodiments, the universal sensor suite 302A may include one or more detachable attachment mechanisms 306A and 306B that may be connected to the outer portion (e.g., along the edges, along the perimeter, or positioned at each corner) of the undersurface of the baseplate 304. Specifically, as further depicted, the one or more detachable attachment mechanisms 306A and 306B may be positioned between the baseplate 304 and the rooftop 106 of the vehicle 102 to removably couple the baseplate 304 to the rooftop 106 of the vehicle 102, for example. In certain embodiments, the one or more detachable attachment mechanisms 306A and 306B may include, for example, one or more industrial-grade suction devices (e.g., vacuum pump suction cups), industrial-grade magnetic devices, industrial-grade Velcro fasteners (e.g., tape, strip, and so forth), or one or more dissolvable adhesives. In certain embodiments, the one or more detachable attachment mechanisms 306A and 306B may be suited to compress or to deform (e.g., to suction (remove air gap), to stick, or to magnetize to the rooftop 106 of the vehicle 102) in a downward direction to removably secure the baseplate 304 to the rooftop 106 of the vehicle 102. In certain embodiments, the one or more attachment mechanisms 306A and 306B may be configured to be easily removable from the rooftop 106 of the vehicle 102 in a non-destructive manner (e.g., without physically damaging the universal sensor assembly 300A).

In certain embodiments, to ensure universality of the mechanical properties (e.g., rigidity, flatness, stability, determinacy, and so forth) irrespective of vehicle 102 and/or vehicle 102 type (e.g., car vs. truck vs. minivan vs. SUV), the universal sensor suite 302A may also include one or more rigid support components 308A, 308B, and 308C that may be mounted to the inner portion (e.g., toward the center) of the undersurface of the baseplate 304. In certain embodiments, the rigid support components 308A, 308B, and 308C may include a high-density material, such as a high-density rubber, a high-density foam, a high-density fiber, a high-density polymer (e.g., high-density polyethylene (HDPE), high-density polycarbonate, high-density nylon, high-density polystyrene, high-density polypropylene, and so forth), a high-density ceramic (e.g., high-density alumina, high-density porcelain), a high-density composite, a high-density alloy, or other suitable high-density material that may be utilized, for example, to at least partially counteract the compression or deformation of the one or more detachable attachment mechanisms 306A and 306B in the downward direction so as to increase a rigidity with respect to the baseplate 304. For example, in one embodiment, the one or more detachable attachment mechanisms 306A and 306B may include one or more vacuum pump suction cups. In such an embodiment, as air is removed from underneath the suction cup (e.g., removing air gap) to secure the detachable attachment mechanisms 306A and 306B to the rooftop of the vehicle 102, the detachable attachment mechanisms 306A and 306B may potentially experience at least some vertical deformation or compression during, for example, the operation of the vehicle 102. To counteract this vertical deformation or compression, the rigid support components 308A, 308B, and 308C may include a high-density material mounted to the undersurface of the baseplate 304 to establish a rigid and stiff support (e.g., floor) that limits and reduces the vertical compression of the detachable attachment mechanisms 306A and 306B. For example, in one embodiment, the rigid support components 308A, 308B, and 308C may include a greater Flexural modulus of elasticity (e.g., a measure of a material stiffness and/or resistance to bend when a force is applied perpendicular to one or more surfaces) as compared to the detachable attachment mechanisms 306A and 306B. In another embodiment, the rigid support components 308A, 308B, and 308C may include a greater Tensile modulus of elasticity (e.g., a measure of a materials flexibility along an axis of strain) as compared to the detachable attachment mechanisms 306A and 306B.

Indeed, in some embodiments, as certain vibrations and/or other dynamic motions may be expected to occur over the lifetime and during the operation of the vehicle 102, the rigid support components 308A, 308B, and 308C may be designed with a predetermined rigidity (e.g., a predetermined Flexural modulus of elasticity or a predetermined Tensile modulus of elasticity), such that the baseplate 304 may be allowed some movement as the vehicle 102 travels without any disturbances to, for example, the calibration and/or pre-calibration of the set of one or more LiDAR sensors 108 and the set of camera sensors 110. That is, in some embodiments, the rigid support components 308A, 308B, and 308C may be provided to ensure that a relative motion between the baseplate 304 and the vehicle 102 remains fixed (e.g., such that the baseplate 304 and the vehicle 102 may move in a steady motion together and concurrently) during the operation of the vehicle 102. In certain embodiments, the rigid support components 308A, 308B, and 308C may include a conical-shaped, high-density material (e.g., a high-density rubber, a high-density foam, a high-density fiber, a high-density polymer, a high-density ceramic, a high-density composite, a high-density alloy, and so forth) for added rigidity, resistance, and strength. For example, in one embodiment, the rigid support components 308A, 308B, and 308C may be conical-shaped, such that the rigidity established and/or reinforced by the rigid support components 308A, 308B, and 308C may increase over the surface area of the rigid support components 308A, 308B, and 308C. In this way, as the attachment mechanisms 306A and 306B compress or deform at least some, the conical-shaped rigid support components 308A, 308B, and 308C may give way to some compression as well (e.g., about halfway), but only to a certain limit as the rigidity of the conical-shaped rigid support components 308A, 308B, and 308C may increase linearly or quasi-linearly with the surface area of the conical-shaped rigid support components 308A, 308B, and 308C until no more compression or deformation is possible (e.g., due to the stiffness and rigidity of the rigid support components 308A, 308B, and 308C with respect to the baseplate 304) In other embodiments, the rigid support components 308A, 308B, and 308C may be cylindrically-shaped, squared-shaped, round-shaped, cubically-shaped, spherically-shaped, or other similar geometry that may be suitable to support a portion of the load of the baseplate 304 and to at least partially counteract the compression or deformation of the one or more detachable attachment mechanisms 306A and 306B in the downward direction so as to increase a rigidity with respect to the baseplate 304. In one embodiment, each of the rigid support components 308A, 308B, and 308C may include the same geometry with respect to each other. In another embodiment, each of the rigid support components 308A, 308B, and 308C may include a different geometry with respect to each other. In some embodiments, the rigid support components 308A, 308B, and 308C and/or attachment mechanisms 306A and 306B may be adjustable such that the rigid support components 308A, 308B, and 308C and/or the attachment mechanisms 306A and 306B may be suitable for each and every type of vehicle 102.

In certain embodiments, as depicted by FIG. 3B, a universal sensor suite 302B may include one or more removable support structures 310A, 310B (e.g., supporting legs) for accurate optimal positioning and placement of the universal sensor assembly 300A onto the rooftop 106 of the vehicle 102. In some embodiments, the removable support structures 310A, 310B may include any of various sets of removable support structures 310A, 310B (e.g., supporting legs). In certain embodiments, the removable support structures 310A, 310B may include, for example, a first end 312A, 312B that may be suitable for detachably mounting to the baseplate 304 and a second end 314A, 314B capable of being detachably mounting to the rooftop 106 of the vehicle 102 and/or to one or more detachable attachment mechanisms 306A and 306B. As will be further appreciated with respect to FIG. 4, the removable support structures 310A, 310B may include any of various sets of removable support structures 310A, 310B (e.g., supporting legs) that may be selected and/or deployed based on vehicle 102 physical dimensions, such as the rooftop size and style, width, vehicle 102 height (e.g., measured from rooftop to ground), flatness, amount of suspension travel, and so forth. In other words, the removable support structures 310A, 310B may be specific one or more particular types of vehicle 102.

Figure 4:
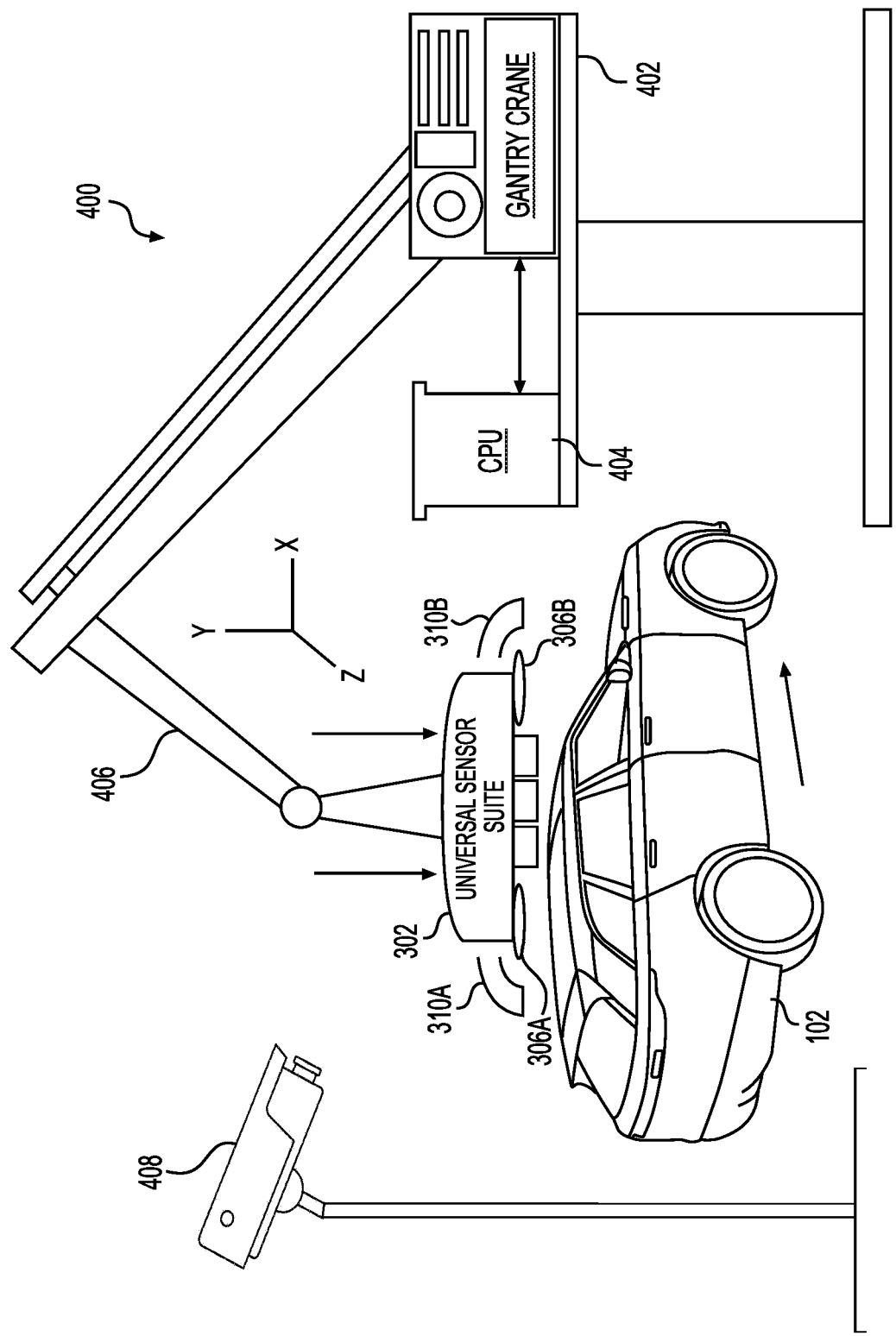
FIG. 4 illustrates a vehicle factory or maintenance service area.

FIG. 4 illustrates a vehicle factory or maintenance service area 400, in accordance with the presently disclosed embodiments. In certain embodiments, the present techniques may not only provide a universal sensor suite 302 that is both easily removable and deployable, but by additionally ensuring the universality of the mechanical properties (e.g., rigidity, flatness, stability, determinacy, and so forth) of the sensor assembly, a number of technical advantages with respect to scalability and increased production efficiency may also be achieved. For example, in certain embodiments, because the universal sensor suite 302 may be free of attachment mechanisms (e.g., legs, supporting structures, stabilizing structures) with dimensions that are specific to only a particular vehicle 102 model and manufacturer and rooftop design, and further allows for universal and/or one-off sensor calibration, the deployment of the universal sensor suite 302 to various types of vehicles (e.g., cars, trucks, minivans, and so forth) may be performed quickly and efficiently utilizing, for example, one or more gantry cranes 402 or other similar mechanisms.

For example, in certain embodiments, the gantry crane 402 may include a central processing unit (CPU) 404 or other control system and a crane arm 406 (e.g., jib arm) that may be utilized to position the universal sensor suite 302 down onto the rooftops of various types of vehicles (e.g., cars, trucks, minivans, SUVs, and so forth). Although FIG. 4 illustrates the gantry crane 402 as an arm crane, it should be noted that the gantry crane 402 may also be a structured ⅔ axis gantry crane in order to provide accurate control and positioning of the universal sensor suite 302. In certain embodiments, the CPU 404 or other control system may monitor different types of vehicles 102 (e.g., different makes and models of cars, trucks, minivans, SUVs, and so forth) as the different types of vehicles 102 arrive at the vehicle factory or maintenance service area 400. For example, in certain embodiments, one or more cameras 408 may be installed and dispersed throughout various locations within and about the vehicle factory or maintenance service area 400 that may be utilized to capture vehicle 102 physical dimensions and/or other data about vehicles 102 as the different types of vehicles 102 arrive at the vehicle factory or maintenance service area 400. The one or more cameras 408 may then provide the captured vehicle 102 physical dimensions and/or other data about vehicles 102 to the CPU 404 for processing. The CPU 404 or other control system may then determine, for example, the most optimal place and position (e.g., frontward, rearward, central, and so forth) on the rooftop for the particular type of vehicle 102 to achieve maximum sensor FOV once the universal sensor suite 302 is deployed to the rooftop of the vehicle 102.

In certain embodiments, the CPU 404 or other control system may determine the most optimal place and position for the universal sensor suite 302 based on, for example, vehicle 102 physical dimensions, such as the rooftop size, style, width, vehicle 102 height (e.g., measured from rooftop to ground), flatness, amount of suspension travel, and so forth. The CPU 404 or other control system may then position the crane arm 406 (e.g., jib arm), and, by extension, the universal sensor suite 302 at the place and position determined to be most optimal. In one embodiment, the vehicle 102 may also be moved and/or rotated into the appropriate position by, for example, a rotatable or movable floor platform that may be included as part of the vehicle factory or maintenance service area 400. The universal sensor suite 302 may be then mounted onto the rooftop for the particular type of vehicle 102 quickly and efficiently by way of the detachable attachment mechanisms 306A, 306B. For example, in some embodiments, the gantry crane 402 may deploy dozens, hundreds, or thousands of universalized sensor suites 302 to any of an entire fleet of various types of vehicles 102 that may enter into the vehicle factory or maintenance service area 400.

In certain embodiments, as further depicted by FIG. 4, it may be suitable to utilize one or more removable support structures 310A, 310B (e.g., supporting legs) for accurate optimal positioning and placement of the universal sensor suite 302. In some embodiments, the removable support structures 310A, 310B may include any of various sets of removable support structures 310A, 310B (e.g., supporting legs) that may be selected, for example, from a stockpile, an inventory, or a library of removable support structures 310A, 310B of the vehicle factory or maintenance service area 400. For example, in some embodiments, based on the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth, the CPU 404 or other control system may select from the stockpile, the inventory, or the library and/or library index the specific removable support structures 310A, 310B for that particular vehicle 102. Similarly, in some embodiments, the detachable attachment mechanisms 306A, 306B may also include any of various sets that may be selected, for example, from a stockpile, an inventory, or a library of the detachable attachment mechanisms 306A, 306B of the vehicle factory or maintenance service area 400. For example, in some embodiments, based on the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth, the CPU 404 or other control system may select from the stockpile, the inventory, or the library and/or library index the specific and specific type of detachable attachment mechanisms 306A, 306B most suitable for that particular vehicle 102. For example, in one embodiment, based on the vehicle 102 and rooftop 106 surface parameters (e.g., height, width, angle, shape, style, contour, flatness, and so forth), the CPU 404 or other control system may determine that one or more industrial-grade suction devices (e.g., suction cups) are more suitable for vehicles 102 rooftop designs including, for example, sleek panoramic rooftop designs (e.g., panoramic glass rooftops or plexiglass rooftops). In another embodiment, based on the vehicle 102 and rooftop 106 surface parameters (e.g., height, width, angle, shape, style, contour, curvature, flatness, and so forth), the CPU 404 or other control system may determine that one or more industrial-grade magnetic devices (e.g., magnets) are more suitable for vehicles 102 rooftop designs including, for example, flat metal or flat fiberglass rooftop designs.

In certain embodiments, as further depicted by FIG. 4, the universal sensor suite 302 may be calibrated with respect to a particular vehicle 102 while being suspended in open air by the gantry crane 402. For example, in some embodiments, when the vehicle 102 drives into the vehicle factory or maintenance service area 400, the gantry crane 402 may determine the model and manufacturer of the vehicle 102, and direct the vehicle 102 to travel into a location underneath the crane arm 406 (e.g., jib arm) and the universal sensor suite 302. As previously noted, in one embodiment, the vehicle 102 may be moved and/or rotated into the location underneath the crane arm 406 (e.g., jib arm) of the gantry crane 402 and the universal sensor suite 302. The universal sensor suite 302 may be then calibrated based on, for example, the vehicle 102 physical dimensions, such as vehicle 102 and rooftop 106 height (e.g., measured from rooftop to ground), vehicle 102 and rooftop 106 width, vehicle 102 and rooftop 106 position, vehicle 102 and rooftop 106 angle, amount of vibration, vehicle 102 dynamics of suspension, vehicle 102 and rooftop 106 shape, vehicle 102 and rooftop 106 contour, vehicle 102 and rooftop 106 flatness, vehicle 102 and rooftop 106 style, and so forth that may be stored and/or calculated by the CPU 404 and the known XYZ coordinate reference plane and angular referenced established between the gantry crane 402 and the vehicle 102. In this way, by determining the vehicle 102 and rooftop 106 physical dimensions, the CPU 404 and gantry crane 402 may ensure that an unoccluded, sweeping 360° FOV and sensor coverage (e.g., thus minimizing or eliminating the possibility of impaired functionality of the set of one or more LiDAR sensors 108 and the set of camera sensors 110) is achieved for all vehicles 102 on which the universal sensor suite 302 is to be deployed.

Figure 5:
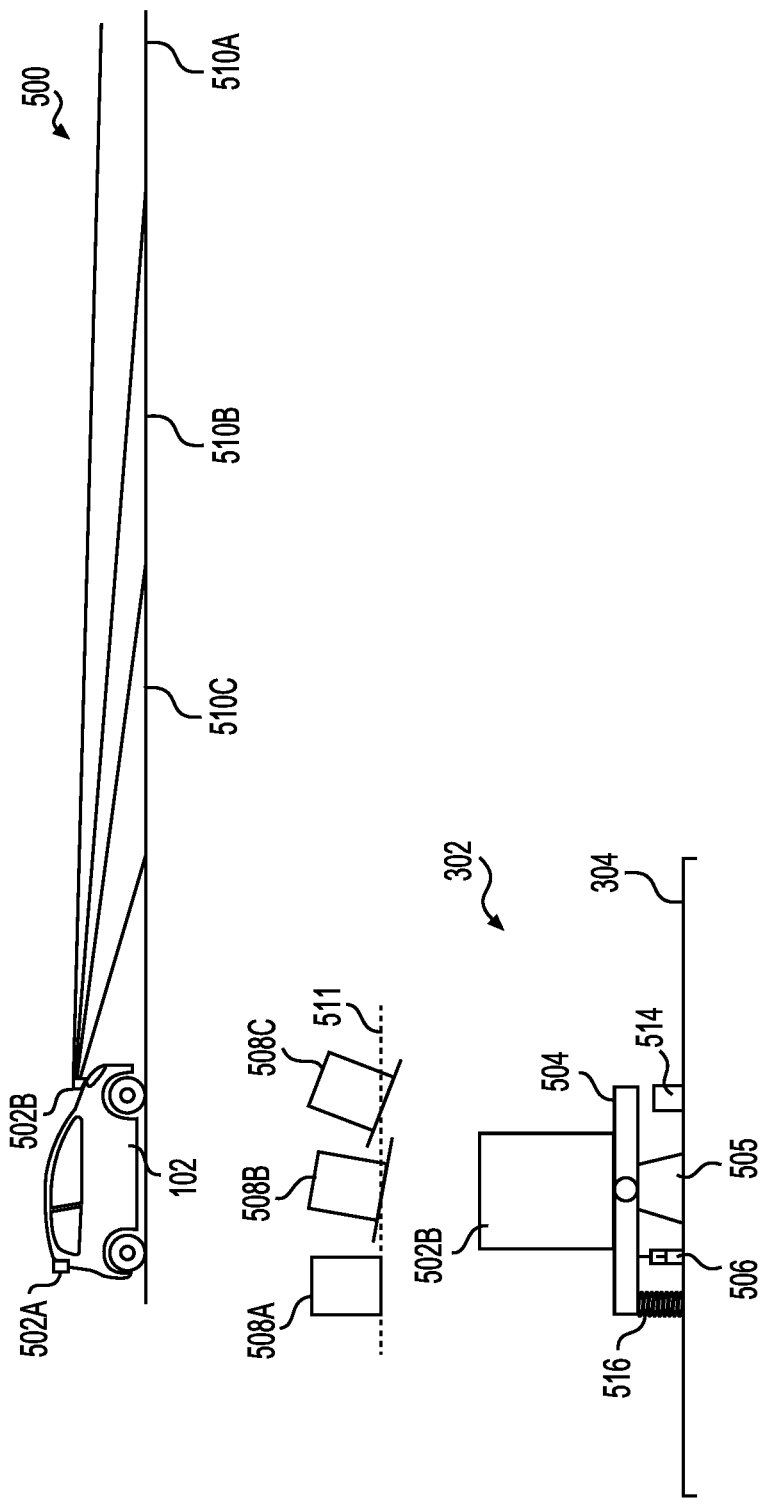
FIG. 5 illustrates an adjustable sensor that pivots based on vehicle speed

In certain embodiments, to further increase scalability and production efficiency, for example, for an entire fleet of various types of vehicles on which the universal sensor assembly is to be deployed, one or more sensors that may be included as part of the universal sensor assembly may be adjustable to cover multiple sensor sight ranges based on, for example, vehicle velocity and/or vehicle and vehicle rooftop physical dimensions. Accordingly, FIG. 5 illustrates an adjustable sensor 500 that pivots based on vehicle speed, in accordance with the present embodiments. For example, in certain embodiments, the universal sensor suite 302 may include one or more adjustable LiDAR sensors 502A, 502B. In other embodiments, the universal sensor suite 302 may include any of various adjustable sensors, such as adjustable camera sensors, adjustable IMU sensors, adjustable radar sensors, or other similar adjustable sensors. In certain embodiments, the adjustable LiDAR sensor 502B may include a pivotable relative angle (defined with respect to a 0° reference plane 511, which is included for the purposes of illustration). For example, the adjustable LiDAR sensor 502B may be mounted to the pivoting surface 504 and pivot 505 (e.g., as part of the universal sensor suite 302, such as on the baseplate 304, or as part of separate and distinct sensor assembly located on a frontside or backside portion of the vehicle 102), in which the relative angle of the pivoting surface 504 may be controlled by a linear actuator 506. In some embodiment in which the adjustable LiDAR sensor 502B is included as part of the universal sensor suite 302, the pivotable relative angle may be defined with respect to the pivoting surface 504 and pivot 505 disposed on the baseplate 304 of the universal sensor suite 302 (e.g., such that a 90° angle is formed between the adjustable LiDAR sensor 502B in the vertical position and the baseplate 304).

In some embodiments, the linear actuator 506 may include, for example, a hydraulic linear actuator, pneumatic linear actuator, an electromechanical actuator, or other linear actuator that may be suitable for mechanically operating to cause the adjustable LiDAR sensor 502B to pivot from a starting position corresponding to a vertical angle position 508A (e.g., at angle of approximately 90° and corresponding to a sensor sight range 510A) to an acute angle position 508B (e.g., corresponding to a sensor sight range 510B) or an acute angle position 508C (e.g., corresponding to a sensor sight range 510C) at decreased velocities. For example, in one embodiment, the adjustable LiDAR sensor 502B may pivot from the vertical angle position 508A (e.g., corresponding to a sensor sight range 510A) to an acute angle position 508B (e.g., corresponding to a sensor sight range 510B) or acute angle position 508C (e.g., corresponding to a sensor sight range 510C) when the vehicle 102 reaches a velocity of approximately 25 mph or lower, for example.

In certain embodiments, as the velocity of the vehicle 102 increases, the linear actuator 506 may cause the adjustable LiDAR sensor 502B to pivot back to the vertical angle position 508A (e.g., at angle of approximately 90° and corresponding to a sensor sight range 510A) at increased velocities. For example, in one embodiment, the adjustable LiDAR sensor 502B may pivot back to the vertical angle position 508A (e.g., corresponding to a sensor sight range 510A) when the vehicle reaches a velocity of approximately 60 mph or higher, for example. For example, in other embodiments, the linear actuator 506 may also be configured to mechanically operate to cause the adjustable LiDAR sensor 502B to pivot in accordance with vehicle 102 velocities over a continuous range of relative angles (e.g., over relative angles from 0° to 90° defined with respect to a 0° reference plane 511, in which the relative angles varies along with changes in vehicle 102 velocity). In this way, the adjustable LiDAR sensor 502B may cover all of the sight ranges 510A, 510B, 510C, and so forth in an efficient manner. Moreover, because the adjustable LiDAR sensor 502B may include a mechanical operation (e.g., as opposed to an electronic and/or computer-based operation), the adjustable LiDAR sensor 502B may exhibit faster response times, and thus increase the overall safety response of the vehicle 102. Additionally, in some embodiments, the adjustable LiDAR sensor 502B may be adjusted based partly on the vehicle 102 and vehicle rooftop 106 physical dimensions (e.g., adjustment of the pivoting angle range of the adjustable LiDAR sensor 502B in view of one or more vehicle rooftop 106 physical dimensions).

In certain embodiments, the adjustable LiDAR sensor 502B may also include a failsafe mechanism (e.g., hydraulic ball and screw mechanism 514 on a first end of the pivoting surface 504 of the adjustable LiDAR sensor 502B and a compression spring 516 on a second end of the pivoting surface 504 of the adjustable LiDAR sensor 502B) to cause the adjustable LiDAR sensor 502B to tilt permanently into the acute angle position 508C (e.g., corresponding to a sensor sight range 510C) to perceive objects that may become apparent directly in front of the vehicle 102, for example, in the case of a misoperation or operator-determined temporary suspension of the pivoting mechanism of the adjustable LiDAR sensor 502B. This may allow the adjustable LiDAR sensor 502B to perceive near-field objects (e.g., typically corresponding to times the vehicle 102 is operating at velocities below 25 mph and being suited for perceiving objects within a distance of approximately 50 m) even in the case in which, for example, a misoperation or an operator-determined temporary suspension of the pivoting mechanism of the adjustable LiDAR sensor 502B occurs.

As an example of the presently disclosed embodiments, a vehicle 102 may begin traveling from a red light (e.g., at rest). Thus, while idling at the red light, the adjustable LiDAR sensor 502B may be positioned to the acute angle position 508C (e.g., corresponding to a sensor sight range 510C) to perceive events directly in front of the vehicle 102, for example. Continuing, as the vehicle 102 accelerates from the red light and reaches a velocity of, for example, 60 mph, the adjustable LiDAR sensor 502B may begin transitioning from the acute angle position 508C (e.g., corresponding to a sensor sight range 510C) to the angle position 508A (e.g., corresponding to a sensor sight range 510A) to perceive events that may be occurring further down the road or highway on which the vehicle is traveling. In some embodiments, the adjustable LiDAR sensor 502B may commence pivoting once a threshold velocity (e.g., a lower threshold velocity and an upper threshold velocity is reached by the vehicle 102). In other embodiments, the adjustable LiDAR sensor 502B may continuous pivot along with any change in velocity of the vehicle 102 threshold velocity (e.g., the pivot angle of the adjustable LiDAR sensor 502B may vary with vehicle 102 velocity). Thus, in accordance with the presently disclosed techniques, the universal sensor suite 302 may include one or more sensors that may be adjustable to cover multiple sensor sight ranges based on, for example, vehicle 102 velocity and/or vehicle 102 and vehicle rooftop 106 physical dimensions. This may further markedly increase scalability and production efficiency, for example, for an entire fleet of various types of vehicles 102 on which the universal sensor suite 302 is to be deployed. Additionally, by including the adjustable LiDAR sensor 502B that pivots based on vehicle speed, resources of the vehicle 102 may be maximized in that the vehicle 102 may be suitable for prioritizing sensed or perceived driving events that it may be immediately and actually responsive to (e.g., a particular far-field possible event at higher speeds and a particular far-field possible event at lower speeds). In this way, instead of expending resources to focus on all possible events, the vehicle 102 may devote its limited resources to focusing on those events that it may be immediately and actually responsive to.

Figure 6:
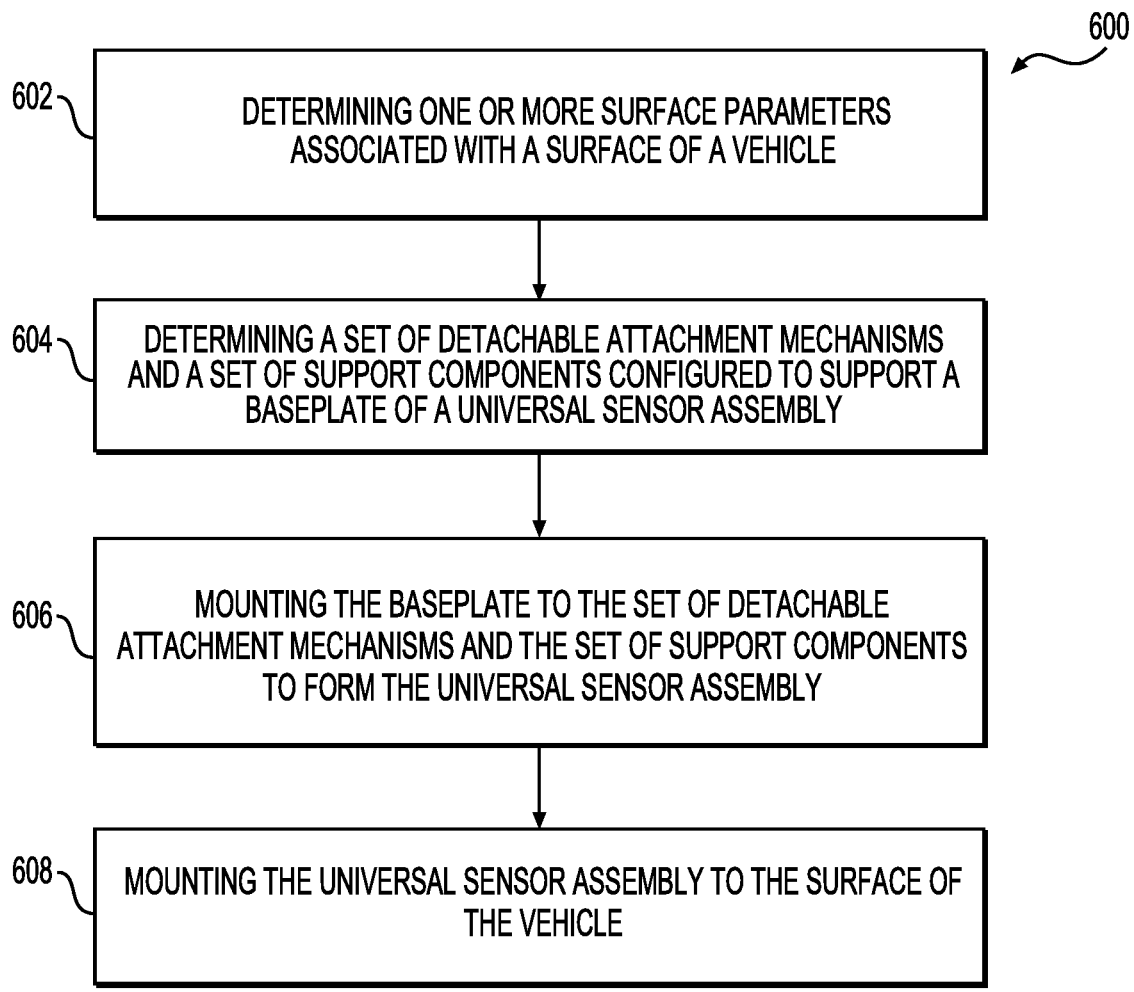
FIG. 6 illustrates a flow diagram of a method for including detachable attachment mechanisms and support components as part of a universal sensor assembly.
Figure 7:
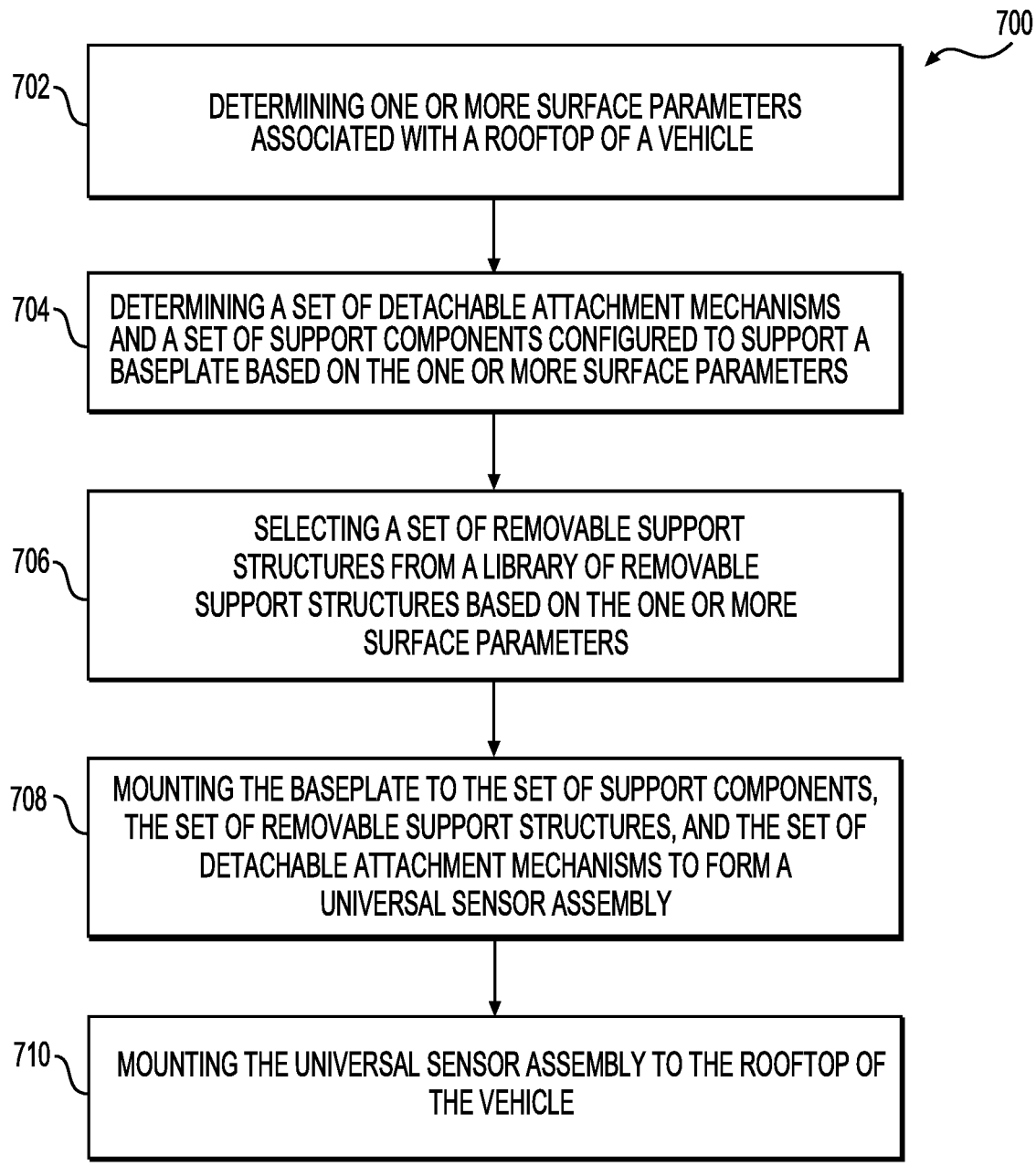
FIG. 7 illustrates a flow diagram of a method for including detachable attachment mechanisms, support components, and removable support structures as part of a universal sensor assembly.
Figure 8:
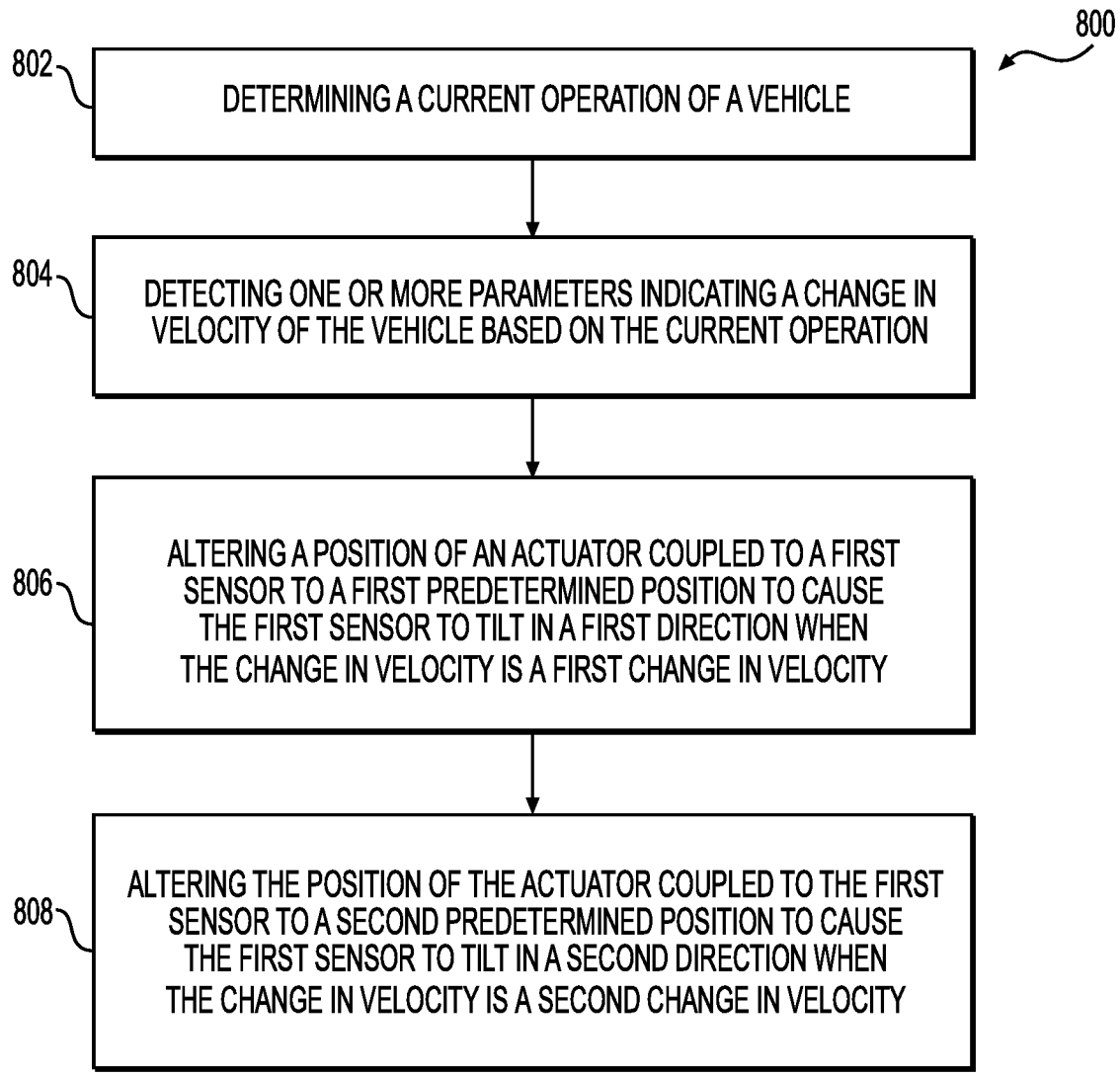
FIG. 8 illustrates a flow diagram of a method for including an adjustable or pivotable sensor as part of a universal sensor assembly.
Figure 9:
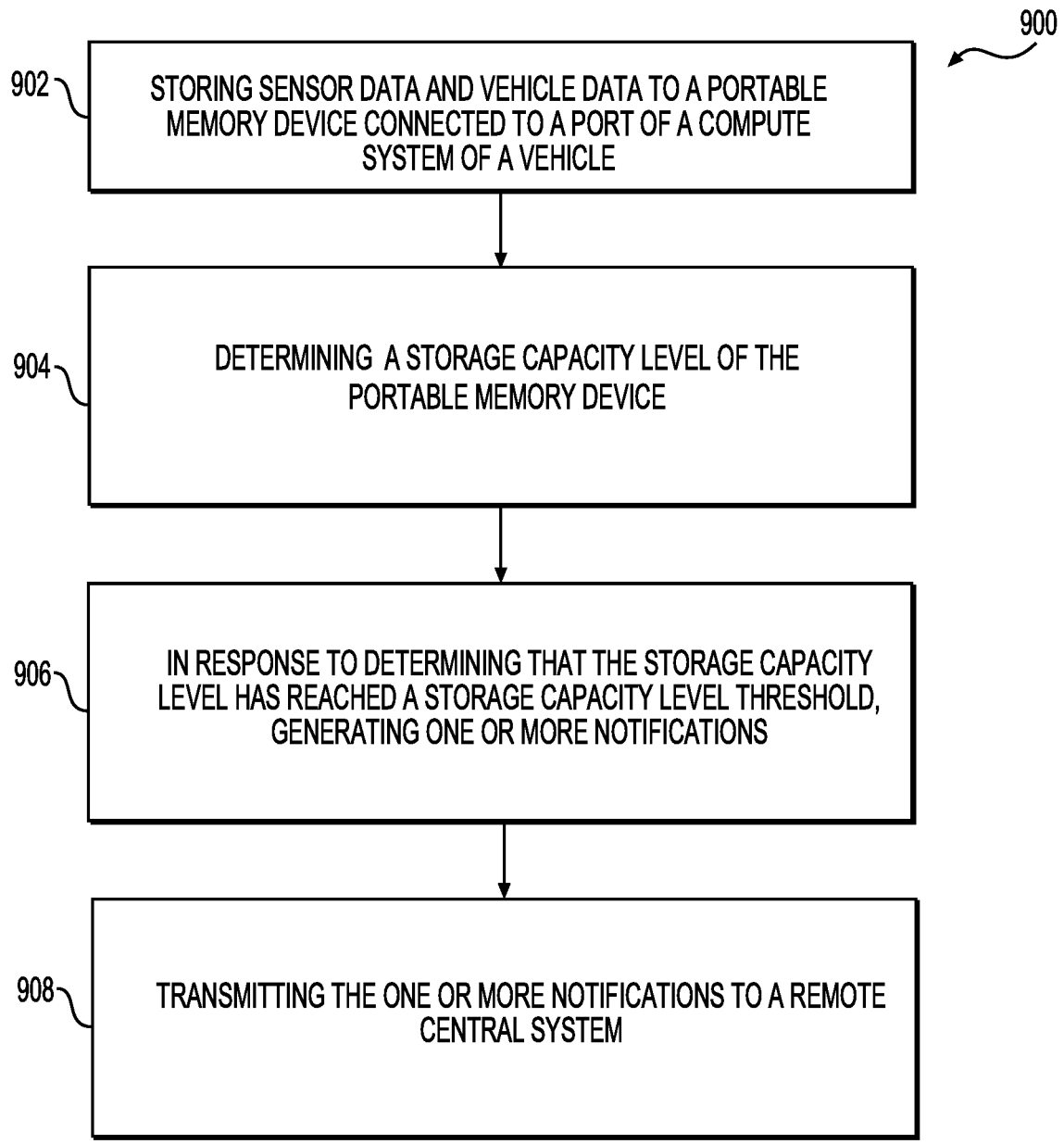
FIG. 9 illustrates a flow diagram of a method for facilitating the collection of sensor data and vehicle data that may be captured by one or more sensors included in a universal sensor assembly.

Turning now to FIGS. 6-9, which each illustrates a method and flowchart that describes one or more embodiments of the present techniques for providing a universal sensor assembly for autonomous or semi-autonomous vehicles, and more particularly to a universal sensor assembly for increasing scalability and production efficiency for an entire fleet of various types of autonomous or semi-autonomous vehicles on which the universal sensor assembly is to be deployed. For example, as will be further appreciated below, FIG. 6 illustrates a flow diagram of a method for including detachable attachment mechanisms and support components as part of the universal sensor assembly, FIG. 7 illustrates a flow diagram of a method for including detachable attachment mechanisms, support components, and removable support structures as part of the universal sensor assembly, FIG. 8 illustrates a flow diagram of a method for including an adjustable or pivotable sensor as part of the universal sensor assembly, and FIG. 9 illustrates a flow diagram of a method for facilitating the collection of sensor data and vehicle data that may be captured by one or more sensors included in the universal sensor assembly. Accordingly, the present techniques may markedly increase scalability and production efficiency, for example, for an entire fleet of various types of vehicles on which the universal sensor assembly is to be deployed.

FIG. 6 illustrates a flow diagram of a method 600 for providing a universal sensor assembly including a set of detachable attachment mechanisms and a set of support components for mounting on an autonomous or semi-autonomous vehicle, in accordance with the presently disclosed embodiments. The method 600 may begin at block 602 determining one or more surface parameters associated with a surface of a vehicle. For example, in certain embodiments, as discussed above with respect to FIG. 4, when the vehicle 102 drives into a factory or maintenance service area 400, the CPU 404 as part of the gantry crane 402 may determine the model and manufacturer of the vehicle 102, and direct the vehicle 102 to travel into a location underneath the crane arm 406 (e.g., jib arm) and the universal sensor suite 302. For example, utilizing the one or more cameras 408, the CPU 404 may determine the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth that may be stored and/or calculated by the CPU 404.

The method 600 may then continue at block 604 with determining a set of detachable attachment mechanisms and a set of support components configured to support a baseplate of a universal sensor assembly based on the one or more surface parameters. For example, in certain embodiments, the universal sensor suite 302A may include one or more detachable attachment mechanisms 306A and 306B that may be connected to, for example, the edges of the bottom surface of the baseplate 304 of the universal sensor suite 302A. As previously discussed above with respect to FIG. 3A, the one or more detachable attachment mechanisms 306A and 306B may include one or more industrial-grade suction devices (e.g., vacuum pump suction cups), industrial-grade magnetic devices, industrial-grade Velcro fasteners (e.g., tape, strip, and so forth), or one or more dissolvable adhesives that may be suitable for coupling the baseplate 304 of the universal sensor suite 302A to, for example, the rooftop 106 of the vehicle 102 (e.g., such that the one or more detachable attachment mechanisms 306A and 306B may be positioned between the baseplate 304 and the rooftop 106 of the vehicle 102).

In certain embodiments, as vibrations and/or other dynamic motions may be expected to occur during the operation of the vehicle 102, the baseplate 304 may include the one or more detachable attachment mechanisms 306A and 306B and rigid support components 308A, 308B, and 308C that may be designed with a predetermined rigidity (e.g., a predetermined Flexural modulus of elasticity or a predetermined Tensile modulus of elasticity), such that the baseplate 304 may be allowed some vertical movement and/or vertical deformation (e.g., due to the one or more detachable attachment mechanisms 306A and 306B experiencing some vertical deformation or compression) as the vehicle 102 travels without any disturbances to, for example, the rigidity (e.g., stiffness) of the baseplate 304, and, by extension, the sensor calibration of the first and second sets of sensors (e.g., LiDARs, cameras) mounted onto the baseplate 304. Specifically, as previously discussed, the rigid support components 308A, 308B, and 308C may stiffen the baseplate 304, such that even if the one or more detachable attachment mechanisms 306A and 306B experiences some vertical deformation or compression, the vertical deformation or compression may be limited and mitigated by the rigidity (e.g., stiffness) provided by the rigid support components 308A, 308B, and 308C.

The method 600 may then continue at block 606 with mounting the baseplate to the set of detachable attachments and the set support components to form the universal sensor assembly and concluding at block 608 with mounting the universal sensor assembly to the surface of the vehicle. For example, the universal sensor suite 302, including the baseplate 304, the one or more detachable attachment mechanisms 306A and 306B, and the rigid support components 308A, 308B, and 308C, may be mounted (e.g., positioned down) onto the vehicle 102. In one embodiment, the universal sensor suite 302 may be mounted manually by, for example, one or more personnel of the factory or maintenance service area 400. In another embodiment, the universal sensor suite 302 may be quickly and efficiently machine mounted by, for example, the gantry crane 402. In this way, the universal sensor suite 302 may be switched from one type of vehicle (e.g., car) to another type of vehicle (e.g., truck) without the individual sensors (e.g., LiDAR sensors, camera sensors) mounted onto the baseplate 304 having to be redesigned or recalibrated. Instead, only the universal sensor suite 302 itself would be calibrated to the particular vehicle type (e.g., car vs. truck vs. minivan vs. semi-trailer, etc.) based on, for example, vehicle height, position, angle, amount of vibration, vehicle dynamics of suspension, and so forth. Specifically, universal sensor suite 302 itself may be calibrated based on, for example, the vehicle 102 physical dimensions, such as vehicle 102 and rooftop 106 height (e.g., measured from rooftop to ground), vehicle 102 and rooftop 106 width, vehicle 102 and rooftop 106 position, vehicle 102 and rooftop 106 angle, amount of vibration, vehicle 102 dynamics of suspension, vehicle 102 and rooftop 106 shape, vehicle 102 and rooftop 106 contour, vehicle 102 and rooftop 106 flatness, vehicle 102 and rooftop 106 style, and so forth that may be stored and/or calculated by the CPU 404 and the known XYZ coordinate reference plane and angular referenced established between the gantry crane 402 and the vehicle 102. In this way, by determining the vehicle 102 and rooftop 106 physical dimensions, the CPU 404 and gantry crane 402 may ensure that an unoccluded, sweeping 360° FOV and sensor coverage (e.g., thus minimizing or eliminating the possibility of impaired functionality of the set of one or more LiDAR sensors 108 and the set of camera sensors 110) is achieved for all vehicles 102 and vehicle 102 types on which the universal sensor suite 302 is to be deployed. Moreover, by the one or more attachment mechanisms 306A and 306B being selectable based on the particular vehicle 102 on which the universal sensor suite 302 is to be deployed, the universal sensor suite 302 may be configured to be easily removable from the rooftop 106 of the vehicle 102 in a non-destructive manner (e.g., without physically damaging the universal sensor assembly 300A).

FIG. 7 illustrates a flow diagram of a method 700 for providing a universal sensor assembly including a set of detachable attachment mechanisms, a set of support components, and a set of removable support structures for mounting on an autonomous or semi-autonomous vehicle, in accordance with the presently disclosed embodiments. The method 700 may begin at block 702 with determining one or more surface parameters associated with a rooftop of a vehicle. For example, in certain embodiments, as discussed above with respect to FIG. 4, when the vehicle 102 drives into a factory or maintenance service area 400, the CPU 404 as part of the gantry crane 402 may determine the model and manufacturer of the vehicle 102, and direct the vehicle 102 to travel into a location underneath the crane arm 406 (e.g., jib arm) and the universal sensor suite 302. For example, utilizing the one or more cameras 408, the CPU 404 may determine the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth that may be stored and/or calculated by the CPU 404.

The method 700 may then continue at block 704 with determining a set of detachable attachment mechanisms and a set of support components configured to support a baseplate of a universal sensor assembly. For example, as previously discussed above, the one or more detachable attachment mechanisms 306A and 306B may include one or more industrial-grade suction devices (e.g., vacuum pump suction cups), industrial-grade magnetic devices, industrial-grade Velcro fasteners (e.g., tape, strip, and so forth), or one or more dissolvable adhesives that may be suitable for coupling the baseplate 304 of the universal sensor suite 302A to, for example, the rooftop 106 of the vehicle 102. Similarly, the rigid support components 308A, 308B, and 308C may include a number of support components that may be designed with a predetermined rigidity (e.g., a predetermined Flexural modulus of elasticity or a predetermined Tensile modulus of elasticity), such that the baseplate 304 may be allowed some vertical movement and/or vertical deformation (e.g., due to the one or more detachable attachment mechanisms 306A and 306B experiencing some vertical deformation or compression) as the vehicle 102 travels.

The method 700 may then continue at block 706 with selecting a set of removable support structures from a library of removable support structures based on the one or more surface parameters associated with the rooftop of the vehicle. For example, In some embodiments, the removable support structures 310A, 310B may include any of various sets of removable support structures 310A, 310B (e.g., supporting legs) that may be selected, for example, from a stockpile, an inventory, or a library of removable support structures 310A, 310B of the vehicle factory or maintenance service area 400. For example, in some embodiments, based on the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth, the CPU 404 or other control system may select from the stockpile, the inventory, or the library and/or library index the specific removable support structures 310A, 310B for that particular vehicle 102. Similarly, in some embodiments, the detachable attachment mechanisms 306A, 306B may also include any of various sets that may be selected, for example, from a stockpile, an inventory, or a library of the detachable attachment mechanisms 306A, 306B of the vehicle factory or maintenance service area 400. For example, in some embodiments, based on the vehicle 102 physical dimensions, such as vehicle 102 and rooftop 106 height (e.g., measured from rooftop to ground), vehicle 102 and rooftop 106 width, vehicle and rooftop position, rooftop angle, amount of vibration, vehicle dynamics of suspension, vehicle 102 and rooftop 106 shape, a vehicle 102 and rooftop 106 contour, vehicle 102 and rooftop 106 flatness, vehicle 102 and rooftop 106 style, and so forth, the CPU 404 or other control system may select from the stockpile, the inventory, or the library and/or library index the specific and specific type of detachable attachment mechanisms 306A, 306B most suitable for that particular vehicle 102. For example, in one embodiment, based on the vehicle 102 and rooftop 106 surface parameters (e.g., height, width, angle, shape, style, contour, flatness, and so forth), the CPU 404 or other control system may determine that one or more industrial-grade suction devices (e.g., suction cups) are more suitable for vehicles 102 rooftop designs including, for example, sleek panoramic rooftop designs (e.g., panoramic glass rooftops or plexiglass rooftops). In another embodiment, based on the vehicle 102 and rooftop 106 surface parameters (e.g., height, width, angle, shape, style, contour, curvature, flatness, and so forth), the CPU 404 or other control system may determine that one or more industrial-grade magnetic devices (e.g., magnets) are more suitable for vehicles 102 rooftop designs including, for example, flat metal or flat fiberglass rooftop designs.

The method 700 may then continue at block 708 with mounting the baseplate to the set support components, the set of removable support structures, and the set of detachable attachment mechanisms to form the universal sensor assembly. For example, in certain embodiments, as discussed above with respect to FIG. 3B, a universal sensor suite 302B may include one or more removable support structures 310A, 310B (e.g., supporting legs) for accurate optimal positioning and placement of the universal sensor assembly 300A onto the rooftop 106 of the vehicle 102. As previously noted, the removable support structures 310A, 310B may include any of various sets of removable support structures 310A, 310B (e.g., supporting legs), which may include, for example, a first end 312A, 312B that may be suitable for detachably mounting to the baseplate 304 and a second end 314A, 314B capable of being detachably mounting to the rooftop 106 of the vehicle 102 and/or to the one or more detachable attachment mechanisms 306A and 306B.

The method 700 may then conclude at block 710 with mounting the universal sensor assembly to the rooftop of the vehicle. For example, the universal sensor suite 302, including the baseplate 304, the one or more detachable attachment mechanisms 306A and 306B, the rigid support components 308A, 308B, and 308C, and the one or more removable support structures 310A, 310B may be mounted (e.g., positioned down via the one or more removable support structures 310A, 310B and the one or more detachable attachment mechanisms 306A and 306B) onto the vehicle 102. In one embodiment, the universal sensor suite 302 may be mounted manually by, for example, one or more personnel of the factory or maintenance service area 400. In another embodiment, the universal sensor suite 302 may be quickly and efficiently machine mounted by, for example, the gantry crane 402. In this way, the universal sensor suite 302 may be switched from one type of vehicle (e.g., car) to another type of vehicle (e.g., truck) without the individual sensors (e.g., LiDAR sensors, camera sensors) mounted onto the baseplate 304 having to be redesigned or recalibrated. Instead, only the universal sensor suite 302 itself would be calibrated to the particular vehicle type (e.g., car vs. truck vs. minivan vs. semi-trailer, etc.) based on, for example, vehicle height, position, angle, amount of vibration, vehicle dynamics of suspension, and so forth. Specifically, universal sensor suite 302 itself may be calibrated based on, for example, the vehicle 102 physical dimensions, such as vehicle 102 and rooftop 106 height (e.g., measured from rooftop to ground), vehicle 102 and rooftop 106 width, vehicle 102 and rooftop 106 position, vehicle 102 and rooftop 106 angle, amount of vibration, vehicle 102 dynamics of suspension, vehicle 102 and rooftop 106 shape, vehicle 102 and rooftop 106 contour, vehicle 102 and rooftop 106 flatness, vehicle 102 and rooftop 106 style, and so forth that may be stored and/or calculated by the CPU 404 and the known XYZ coordinate reference plane and angular referenced established between the gantry crane 402 and the vehicle 102. In this way, by determining the vehicle 102 and rooftop 106 physical dimensions, the CPU 404 and gantry crane 402 may ensure that an unoccluded, sweeping 360° FOV and sensor coverage (e.g., thus minimizing or eliminating the possibility of impaired functionality of the set of one or more LiDAR sensors 108 and the set of camera sensors 110) is achieved for all vehicles 102 and vehicle 102 types on which the universal sensor suite 302 is to be deployed. Moreover, by the one or more attachment mechanisms 306A and 306B and/or the removable support structures 310A, 310B being swappable and selectable based on the particular vehicle 102 on which the universal sensor suite 302 is to be deployed, the universal sensor suite 302 may be configured to be easily removable from the rooftop 106 of the vehicle 102 in a non-destructive manner (e.g., without physically damaging the universal sensor assembly 300B).

FIG. 8 illustrates a flow diagram of a method 800 for including an adjustable or pivotable sensor as part of the universal sensor assembly, in accordance with the presently disclosed embodiments. The method 800 may begin at block 802 with determining a current operation of a vehicle. For example, the vehicle 102 may be operated within the environment 100 (e.g. a real-world environment). The method 800 may then continue at block 804 with detecting one or more measurement parameters indicating a change in velocity of the vehicle based on the current operation. For example, the measurement parameters may include a direct vehicle 102 velocity, a direct vehicle 102 acceleration, a vehicle 102 throttle position, a vehicle 102 torque, a vehicle 102 fuel range, a vehicle 102 charge range, a vehicle 102 clutch engagement and/or disengagement, a vehicle 102 driving mode, a vehicle 102 air-to-fuel ratio, or other measurement parameters that may indicate a change in velocity of the vehicle 102.

The method 800 may then continue at block 806 with altering a position of an actuator coupled to a first sensor to a first predetermined position to cause the first sensor to tilt in a first direction when the change in velocity corresponds to a first change in velocity. For example, in certain embodiments, the universal sensor suite 302 may include one or more adjustable LiDAR sensors 502A, 502B. In other embodiments, the universal sensor suite 302 may include any of various adjustable sensors, such as adjustable camera sensors, adjustable IMU sensors, adjustable radar sensors, or other similar adjustable sensors. In certain embodiments, the LiDAR sensor 502B may include a pivotable relative angle (defined with respect to a 0° reference plane 511, which is included for the purposes of illustration). For example, the adjustable LiDAR sensor 502B may be mounted to the pivoting surface 504 and pivot 505 (e.g., as part of the universal sensor suite 302, such as on the baseplate 304, or as part of separate and distinct sensor assembly located on a frontside or backside portion of the vehicle 102), in which the relative angle of the pivoting surface 504 may be controlled by a linear actuator 506.

In some embodiments, the linear actuator 506 may include, for example, a hydraulic linear actuator, pneumatic linear actuator, an electromechanical actuator, or other linear actuator that may be suitable for mechanically operating to cause the adjustable LiDAR sensor 502B to pivot from a starting position corresponding to a vertical angle position 508A (e.g., at angle of approximately 90° and corresponding to a sensor sight range 510A) to an acute angle position 508B (e.g., corresponding to a sensor sight range 510B) or an acute angle position 508C (e.g., corresponding to a sensor sight range 510C) at decreased velocities. For example, in one embodiment, the adjustable LiDAR sensor 502B may pivot from the vertical angle position 508A (e.g., corresponding to a sensor sight range 510A) to an acute angle position 508B (e.g., corresponding to a sensor sight range 510B) or acute angle position 508C (e.g., corresponding to a sensor sight range 510C) at velocities lower than approximately 25 mph, for example.

In certain embodiments, as the velocity of the vehicle 102 increases, the linear actuator 506 may cause the adjustable LiDAR sensor 502B to pivot back to the vertical angle position 508A (e.g., at angle of approximately 90° and corresponding to a sensor sight range 510A) at increased velocities. For example, in one embodiment, the adjustable LiDAR sensor 502B may pivot back to the vertical angle position 508A (e.g., corresponding to a sensor sight range 510A) at velocities higher than approximately 60 mph, for example. The method 800 may then conclude at block 808 with altering the position of the actuator coupled to the first sensor to a second predetermined position to cause the first sensor to tilt in a second direction when the change in velocity corresponds to a second change in velocity. For example, in other embodiments, the linear actuator 506 may also be configured to mechanically operate to cause the adjustable LiDAR sensor 502B to pivot in accordance with vehicle 102 velocities over a continuous range of relative angles (e.g., over relative angles from 0° to 90° that varies along with changes in vehicle 102 velocity). In this way, the adjustable LiDAR sensor 502B may cover all of the sight ranges 510A, 510B, 510C, and so forth in an efficient manner. Moreover, because the adjustable LiDAR sensor 502B may include a mechanical operation (e.g., as opposed to an electronic and/or computer-based operation), the adjustable LiDAR sensor 502B may exhibit faster response times, and thus increase the overall safety response of the vehicle 102.

In certain embodiments, the adjustable LiDAR sensor 502B may also include a failsafe mechanism (e.g., hydraulic ball and screw mechanism 514 on a first end of the pivoting surface 504 of the adjustable LiDAR sensor 502B and a compression spring 516 on a second end of the pivoting surface 504 of the adjustable LiDAR sensor 502B) to cause the adjustable LiDAR sensor 502B to tilt permanently into the acute angle position 508C (e.g., corresponding to a sensor sight range 510C) to perceive objects that may become apparent directly in front of the vehicle 102, for example, in the case of a misoperation or operator-determined temporary suspension of the pivoting mechanism of the adjustable LiDAR sensor 502B. This may allow the adjustable LiDAR sensor 502B to perceive near-field objects (e.g., typically corresponding to times the vehicle 102 is operating at velocities below 25 mph and being suited for perceiving objects within a distance of approximately 50 m) even in the case in which, for example, a misoperation or an operator-determined temporary suspension of the pivoting mechanism of the adjustable LiDAR sensor 502B occurs. Thus, in accordance with the presently disclosed techniques, the universal sensor assembly may include one or more sensors that may be adjustable to cover multiple sensor sight ranges based on, for example, vehicle velocity and/or vehicle and vehicle rooftop physical dimensions. This may further markedly increase scalability and production efficiency, for example, for an entire fleet of various types of vehicles on which the universal sensor assembly is to be deployed. Additionally, by including the adjustable LiDAR sensor 502B that pivots based on vehicle speed, resources of the vehicle 102 may be maximized in that the vehicle 102 may be suitable for prioritizing sensed or perceived driving events that it may be immediately and actually responsive to (e.g., a particular far-field possible event at higher speeds and a particular far-field possible event at lower speeds). In this way, instead of expending resources to focus on all possible events, the vehicle 102 may devote its limited resources to focusing on those events that it may be immediately and actually responsive to.

FIG. 9 is a flow diagram of a method 900 for facilitating the collection of sensor data and vehicle data that may be captured by one or more sensors included in the universal sensor assembly, in accordance with the presently disclosed embodiments. The method 900 may begin at block 902 with the compute system storing sensor data and vehicle data to a portable memory device connected to a port of a compute system of a vehicle. For example, in certain embodiments, to further reduce complexity and facilitate sensor data and vehicle data collection by a remote central system, a compute system of the vehicle 102 may include one or more communication ports (e.g., universal synchronous asynchronous receiver transmitter (USART) port, serial peripheral interface (SPI) port, ethernet port, universal serial bus (USB) port, local interconnect network (LIN) port, and so forth) in which one or more portable storage devices may be installed thereinto. The method 900 may then continue at block 904 with the compute system determining a storage capacity level of the portable memory device.

For example, in some embodiments, the portable memory device may include, for example, a solid-state memory device (e.g., NAND flash) that may be installed into the communication ports to record or download vehicle data and sensor data of the vehicle 102 locally (e.g., at the vehicle 102) until indicating that its storage capacity or other threshold capacity level is reached. The method 900 may then continue at block 906 with the compute system generating one or more notifications in response to determining that the portable memory device that has reached its maximum storage capacity level or other threshold capacity level. The method 900 may then conclude at block 908 with the compute system transmitting the one or more notifications to a remote central system. For example, the compute system of the vehicle 102 may generate and provide one or more notifications to a remote central system (e.g., centralized data processing center, a cloud computing based service, one or more distributed servers, etc.) to indicate that the portable memory device has reached its storage capacity and that another portable memory device is to be provided to replace the portable memory device. The portable memory device may be then manually removed from the compute system of the vehicle 102 and replaced (e.g., by instructing and/or driving the vehicle 102 to a centralized location and replacing the memory device with another memory device), thus eliminating any cumbersome tasks to inefficiently transmit the vehicle data over wireless networks. This may increase scalability and data management efficiency for an entire fleet of various types of vehicles.

Figure 10:
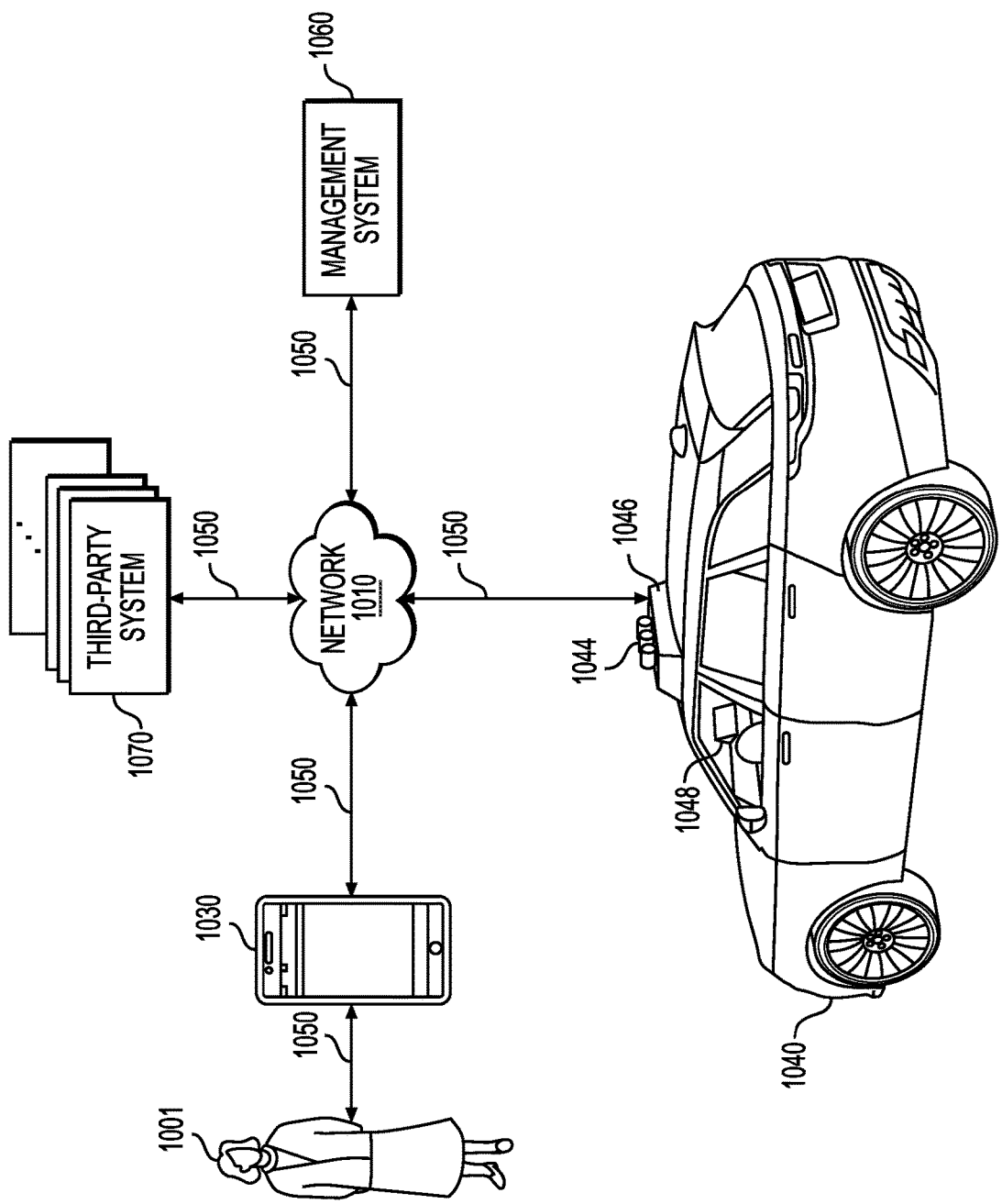
FIG. 10 illustrates an example block diagram of a transportation management environment.

FIG. 10 illustrates an example computer system 1000 that may be utilized to perform one or more of the forgoing embodiments as discussed herein. In certain embodiments, one or more computer systems 1000 perform one or more steps of one or more methods described or illustrated herein. In certain embodiments, the environment may include various computing entities, such as a user computing device 1030 of a user 1001 (e.g., a ride provider or requestor), a transportation management system 1060, an autonomous or semi-autonomous vehicle 1040, and one or more third-party system 1070. The computing entities may be communicatively connected over any suitable network 1010. As an example, and not by way of limitation, one or more portions of network 1010 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In certain embodiments, any suitable network arrangement and protocol enabling the computing entities to communicate with each other may be used. Although FIG. 10 illustrates a single user device 1030, a single transportation management system 1060, a single vehicle 1040, a plurality of third-party systems 1070, and a single network 1010, this disclosure contemplates any suitable number of each of these entities. As an example, and not by way of limitation, the network environment may include multiple users 1001, user devices 1030, transportation management system 1060, autonomous or semi-autonomous vehicles 1040, third-party systems 1070, and networks 1010.

The user device 1030, transportation management system 1060, autonomous or semi-autonomous vehicle 1040, and third-party system 1070 may be communicatively connected or co-located with each other in whole or in part. These computing entities may communicate via different transmission technologies and network types. For example, the user device 1030 and the vehicle 1040 may communicate with each other via a cable or short-range wireless communication (e.g., Bluetooth, NFC, WI-FI, etc.), and together they may be connected to the Internet via a cellular network that is accessible to either one of the devices (e.g., the user device 1030 may be a smartphone with LTE connection). The transportation management system 1060 and third-party system 1070, on the other hand, may be connected to the Internet via their respective LAN/WLAN networks and Internet Service Providers (ISP).

FIG. 10 illustrates transmission links 1050 that connect user device 1030, autonomous or semi-autonomous vehicle 1040, transportation management system 1060, and third-party system 1070 to communication network 1010. This disclosure contemplates any suitable transmission links 1050, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In certain embodiments, one or more links 1050 may connect to one or more networks 1010, which may include in part, e.g., ad-hoc network, the Intranet, extranet, VPN, LAN, WLAN, WAN, WWAN, MAN, PSTN, a cellular network, a satellite network, or any combination thereof. The computing entities may not necessarily use the same type of transmission link 1050. For example, the user device 1030 may communicate with the transportation management system via a cellular network and the Internet but communicate with the autonomous vehicle 1040 via Bluetooth or a physical wire connection.

In certain embodiments, the transportation management system 1060 may fulfill ride requests for one or more users 1001 by dispatching suitable vehicles. The transportation management system 1060 may receive any number of ride requests from any number of ride requestors 1001. In certain embodiments, a ride request from a ride requestor 1001 may include an identifier that identifies the ride requestor in the system 1060. The transportation management system 1060 may use the identifier to access and store the ride requestor's 1001 information, in accordance with the requestor's 1001 privacy settings. The ride requestor's 1001 information may be stored in one or more data stores (e.g., a relational database system) associated with and accessible to the transportation management system 1060. In certain embodiments, ride requestor information may include profile information about a particular ride requestor 1001.

In certain embodiments, the ride requestor 1001 may be associated with one or more categories or types, through which the ride requestor 1001 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when traveling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In certain embodiments, the transportation management system 1060 may classify a user 1001 based on known information about the user 1001 (e.g., using machine-learning classifiers), and use the classification to retrieve relevant aggregate information associated with that class. For example, the system 1060 may classify a user 1001 as a young adult and retrieve relevant aggregate information associated with young adults, such as the type of music generally preferred by young adults.

Transportation management system 1060 may also store and access ride information. Ride information may include locations related to the ride, traffic data, route options, optimal pick-up or drop-off locations for the ride, or any other suitable information associated with a ride. As an example, and not by way of limitation, when the transportation management system 1060 receives a request to travel from San Francisco International Airport (SFO) to Palo Alto, California, the system 1060 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride.

In certain embodiments, portions of the ride information may be based on historical data associated with historical rides facilitated by the system 1060. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1060. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc.

As yet another example, historical data associated with all users may include general usage trends, such as traffic and ride patterns. Using historical data, the system 1060 in certain embodiments may predict and provide ride suggestions in response to a ride request. In certain embodiments, the system 1060 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In certain embodiments, transportation management system 1060 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In certain embodiments, each server may include hardware, software, or embedded logic components or a combination of two or more such components for carrying out the appropriate functionalities implemented or supported by the server.

In certain embodiments, transportation management system 1060 may include one or more data stores. The data stores may be used to store various types of information, such as ride information, ride requestor information, ride provider information, historical information, third-party information, or any other suitable type of information. In certain embodiments, the information stored in the data stores may be organized according to specific data structures. In certain embodiments, each data store may be a relational, columnar, correlation, or any other suitable type of database system. Although this disclosure describes or illustrates particular types of databases, this disclosure contemplates any suitable types of databases. Certain embodiments may provide interfaces that enable a user device 1030 (which may belong to a ride requestor or provider), a transportation management system 1060, vehicle system 1040, or a third-party system 1070 to process, transform, manage, retrieve, modify, add, or delete the information stored in the data store.

In certain embodiments, transportation management system 1060 may include an authorization server (or any other suitable component(s)) that allows users 1001 to opt-in to or opt-out of having their information and actions logged, recorded, or sensed by transportation management system 1060 or shared with other systems (e.g., third-party systems 1070). In certain embodiments, a user 1001 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1001 of transportation management system 1060 through blocking, data hashing, anonymization, or other suitable techniques as appropriate.

In certain embodiments, third-party system 1070 may be a network-addressable computing system that may provide HD maps or host GPS maps, customer reviews, music or content, weather information, or any other suitable type of information. Third-party system 1070 may generate, store, receive, and send relevant data, such as, for example, map data, customer review data from a customer review website, weather data, or any other suitable type of data. Third-party system 1070 may be accessed by the other computing entities of the network environment either directly or via network 1010. For example, user device 1030 may access the third-party system 1070 via network 1010, or via transportation management system 1060. In the latter case, if credentials are to be accessed the third-party system 1070, the user 1001 may provide such information to the transportation management system 1060, which may serve as a proxy for accessing content from the third-party system 1070.

In certain embodiments, user device 1030 may be a mobile computing device such as a smartphone, tablet computer, or laptop computer. User device 1030 may include one or more processors (e.g., CPU and/or GPU), memory, and storage. An operating system and applications may be installed on the user device 1030, such as, e.g., a transportation application associated with the transportation management system 1060, applications associated with third-party systems 1070, and applications associated with the operating system. User device 1030 may include functionality for determining its location, direction, or orientation, based on integrated sensors such as GPS, compass, gyroscope, or accelerometer. User device 1030 may also include wireless transceivers for wireless communication and may support wireless communication protocols such as Bluetooth, near-field communication (NFC), infrared (IR) communication, WI-FI, and/or 2G/3G/4G/LTE/5G mobile communication standard. User device 1030 may also include one or more cameras, scanners, touchscreens, microphones, speakers, and any other suitable input-output devices.

In certain embodiments, the vehicle 1040 may be an autonomous or semi-autonomous vehicle and equipped with an array of sensors 1044, a navigation system 1046, and a ride-service computing device 1048. In certain embodiments, a fleet of autonomous or semi-autonomous vehicles 1040 may be managed by the transportation management system 1060. The fleet of autonomous vehicles 1040, in whole or in part, may be owned by the entity associated with the transportation management system 1060, or they may be owned by a third-party entity relative to the transportation management system 1060. In either case, the transportation management system 1060 may control the operations of the autonomous vehicles 1040, including, e.g., dispatching select vehicles 1040 to fulfill ride requests, instructing the vehicles 1040 to perform select operations (e.g., head to a service center or charging/fueling station, pull over, stop immediately, self-diagnose, lock/unlock compartments, change music station, change temperature, and any other suitable operations), and instructing the vehicles 1040 to enter select operation modes (e.g., operate normally, drive at a reduced speed, drive under the command of human operators, and any other suitable operational modes).

In certain embodiments, the autonomous or semi-autonomous vehicles 1040 may receive data from and transmit data to the transportation management system 1060 and the third-party system 1070. Example of received data may include, e.g., instructions, new software or software updates, maps, 3D models, trained or untrained machine-learning models, location information (e.g., location of the ride requestor, the autonomous or semi-autonomous vehicle 1040 itself, other vehicles 1040, and target destinations such as service centers), navigation information, traffic information, weather information, entertainment content (e.g., music, video, and news) ride requestor information, ride information, and any other suitable information. Examples of data transmitted from the autonomous or semi-autonomous vehicle 1040 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1040, passengers may send/receive data to the transportation management system 1060 and/or third-party system 1070), and any other suitable data.

In certain embodiments, autonomous or semi-autonomous vehicles 1040 may also communicate with each other as well as other traditional human-driven vehicles, including those managed and not managed by the transportation management system 1060. For example, one vehicle 1040 may communicate with another vehicle data regarding their respective location, condition, status, sensor reading, and any other suitable information. In certain embodiments, vehicle-to-vehicle communication may take place over direct short-range wireless connection (e.g., WI-FI, Bluetooth, NFC) and/or over a network (e.g., the Internet or via the transportation management system 1060 or third-party system 1070).

In certain embodiments, an autonomous or semi-autonomous vehicle 1040 may obtain and process sensor/telemetry data. Such data may be captured by any suitable sensors. For example, the vehicle 1040 may have a LiDAR sensor array of multiple LiDAR transceivers that are configured to rotate 360°, emitting pulsed laser light and measuring the reflected light from objects surrounding vehicle 1040. In certain embodiments, LiDAR transmitting signals may be steered by use of a gated light valve, which may be a MEMs device that directs a light beam using the principle of light diffraction. Such a device may not use a gimbaled mirror to steer light beams in 360° around the autonomous or semi-autonomous vehicle. Rather, the gated light valve may direct the light beam into one of several optical fibers, which may be arranged such that the light beam may be directed to many discrete positions around the autonomous or semi-autonomous vehicle. Thus, data may be captured in 360° around the autonomous or semi-autonomous vehicle, but no rotating parts may be necessary. A LiDAR is an effective sensor for measuring distances to targets, and as such may be used to generate a 3D model of the external environment of the autonomous or semi-autonomous vehicle 1040. As an example, and not by way of limitation, the 3-D model may represent the external environment including objects such as other cars, curbs, debris, objects, and pedestrians up to a maximum range of the sensor arrangement (e.g., 50 meters, 100 meters, or 200 meters).

As another example, the autonomous or semi-autonomous vehicle 1040 may have optical cameras pointing in different directions. The cameras may be used for, e.g., recognizing roads, lane markings, street signs, traffic lights, police, other vehicles, and any other visible objects of interest. To enable the vehicle 1040 to "see" at night, infrared cameras may be installed. In certain embodiments, the vehicle may be equipped with stereo vision for, e.g., spotting hazards such as pedestrians or tree branches on the road. As another example, the vehicle 1040 may have radars for, e.g., detecting other vehicles and/or hazards afar. Furthermore, the vehicle 1040 may have ultrasound equipment for, e.g., parking and obstacle detection. In addition to sensors enabling the vehicle 1040 to detect, measure, and understand the external world around it, the vehicle 1040 may further be equipped with sensors for detecting and self-diagnosing the vehicle's own state and condition. For example, the vehicle 1040 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection.

While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1040 may build a 3D model of its surrounding based on data from its LiDAR, radar, sonar, and cameras, along with a pre-generated map obtained from the transportation management system 1060 or the third-party system 1070. Although sensors 1044 appear in a particular location on autonomous vehicle 1040 in FIG. 10, sensors 1044 may be located in any suitable location in or on the autonomous or semi-autonomous vehicle 1040. Example locations for sensors include the front and rear bumpers, the doors, the front windshield, on the side panel, or any other suitable location.

In certain embodiments, the autonomous vehicle 1040 may be equipped with a processing unit (e.g., one or more CPUs and GPUs), memory, and storage. The vehicle 1040 may thus be equipped to perform a variety of computational and processing tasks, including processing the sensor data, extracting useful information, and operating accordingly. For example, based on images captured by its cameras and a machine-vision model, the vehicle 1040 may identify particular types of objects captured by the images, such as pedestrians, other vehicles, lanes, curbs, and any other objects of interest. In certain embodiments, the autonomous vehicle 1040 may have a navigation system 1046 responsible for safely navigating the autonomous vehicle 1040. In certain embodiments, the navigation system 1046 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1046 may also utilize, e.g., map data, traffic data, accident reports, weather reports, instructions, target destinations, and any other suitable information to determine navigation routes and particular driving operations (e.g., slowing down, speeding up, stopping, swerving, etc.). In certain embodiments, the navigation system 1046 may use its determinations to control the vehicle 1040 to operate in prescribed manners and to guide the autonomous vehicle 1040 to its destinations without colliding into other objects. Although the physical embodiment of the navigation system 1046 (e.g., the processing unit) appears in a particular location on autonomous vehicle 1040 in FIG. 10, navigation system 1046 may be located in any suitable location in or on autonomous vehicle 1040. Example locations for navigation system 1046 include inside the cabin or passenger compartment of autonomous vehicle 1040, near the engine/battery, near the front seats, rear seats, or in any other suitable location.

In certain embodiments, the autonomous or semi-autonomous vehicle 1040 may be equipped with a ride-service computing device 1048, which may be a tablet computer, or any other suitable device installed by transportation management system 1060 to allow the user to interact with the autonomous vehicle 1040, transportation management system 1060, other users 1001, or third-party systems 1070. In certain embodiments, installation of ride-service computing device 1048 may be accomplished by placing the ride-service computing device 1048 inside autonomous vehicle 1040, and further configuring it to communicate with the vehicle 1040 via a wire or wireless connection (e.g., via Bluetooth). Although FIG. 10 illustrates a single ride-service computing device 1048 at a particular location in autonomous vehicle 1040, autonomous or semi-autonomous vehicle 1040 may include several ride-service computing devices 1048 in several different locations within the vehicle.

As an example, and not by way of limitation, the autonomous or semi-autonomous vehicle 1040 may include four ride-service computing devices 1048 located in the following places: one in front of the front-left passenger seat (e.g., driver's seat in traditional U.S. automobiles), one in front of the front-right passenger seat, one in front of each of the rear-left and rear-right passenger seats. In certain embodiments, ride-service computing device 1048 may be detachable from any component of autonomous vehicle 1040. This may allow users to handle ride-service computing device 1048 in a manner consistent with other tablet computing devices. As an example, and not by way of limitation, a user may move ride-service computing device 1048 to any location in the cabin or passenger compartment of the autonomous or semi-autonomous vehicle 1040, may hold ride-service computing device 1048, or handle ride-service computing device 1048 in any other suitable manner. Although this disclosure describes providing a particular computing device in a particular manner, this disclosure contemplates providing any suitable computing device in any suitable manner.

Figure 11:
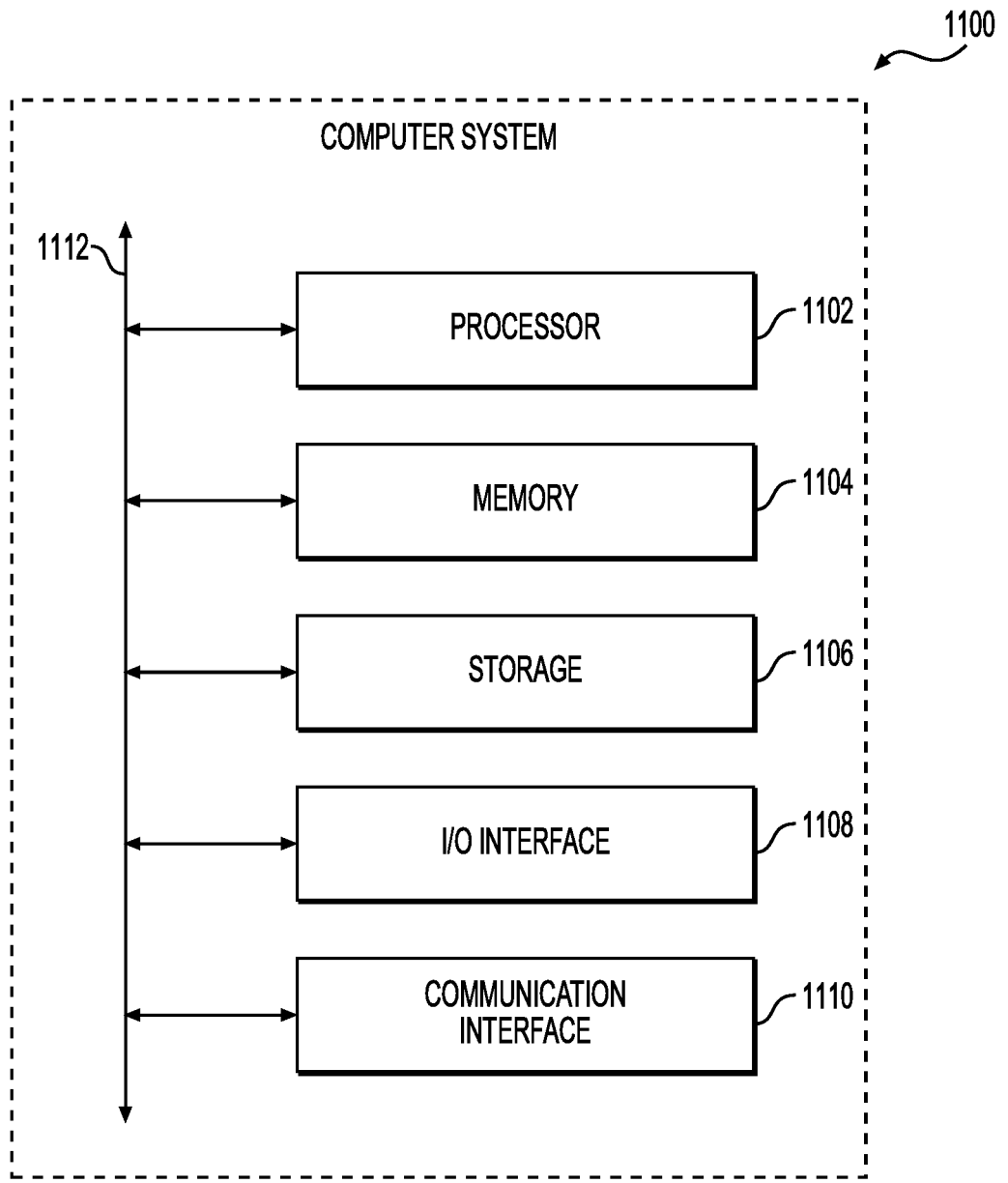
FIG. 11 illustrates an example of a computing system.

FIG. 11 illustrates an example computer system 1100 that may be utilized to perform one or more of the forgoing embodiments as discussed herein. In certain embodiments, one or more computer systems 1100 perform one or more steps of one or more methods described or illustrated herein. In certain embodiments, one or more computer systems 1100 provide the functionalities described or illustrated herein. In certain embodiments, software running on one or more computer systems 1100 performs one or more steps of one or more methods described or illustrated herein or provides the functionalities described or illustrated herein. Certain embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example, and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In certain embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement. In certain embodiments, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In certain embodiments, processor 1102 may include one or more internal caches for data, instructions, or addresses.

This disclosure contemplates processor 1102 including any suitable number of any suitable internal caches, where appropriate. As an example, and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In certain embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In certain embodiments, memory 1104 includes main memory for storing instructions for processor 1102 to execute or data for processor 1102 to operate on. As an example, and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104.

In certain embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In certain embodiments, one or more memory management units (MMUs) reside between processor 1102 and memory 1104 and facilitate accesses to memory 1104 requested by processor 1102. In certain embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In certain embodiments, storage 1106 includes mass storage for data or instructions. As an example, and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In certain embodiments, storage 1106 is non-volatile, solid-state memory. In certain embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In certain embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In certain embodiments, communication interface 1110 includes hardware, software, or both providing one or more interfaces for communication (such as, for example, packet-based communication) between computer system 1100 and one or more other computer systems 1100 or one or more networks. As an example, and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example, and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In certain embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A universal sensor assembly configured for mounting on a vehicle, the universal sensor assembly comprising:
   a sensor suite, comprising:
      a baseplate configured to provide a common coordinate frame by which a sensor calibration is to be performed based thereon; and
      at least one sensor being supported by the baseplate and calibrated based on the common coordinate frame, the at least one sensor including a field of view (FOV) associated with detecting one or more objects within an environment surrounding the vehicle; and
   a support structure, comprising:
      a set of detachable attachment mechanisms supporting the baseplate, wherein the set of detachable attachment mechanisms is included on a rooftop of the vehicle at one or more positions that are based at least in part on one or more surface parameters associated with the rooftop of the vehicle; and
      at least one support component supporting the baseplate, wherein the at least one support component is disposed at a position on the rooftop of the vehicle that is based at least in part on the one or more surface parameters so that the FOV of the at least one sensor is unoccluded by the vehicle and the support structure.

2. The universal sensor assembly of claim 1, wherein the set of detachable attachment mechanisms is mounted to an undersurface of the baseplate, and wherein the set of detachable attachment mechanisms is configured to compress in a first direction for detachably mounting the baseplate onto the rooftop of the vehicle.

3. The universal sensor assembly of claim 2, wherein the at least one support component is mounted to an inner portion of the undersurface of the baseplate, and wherein the at least one support component is configured to at least partially counteract the compression in the first direction by the set of detachable attachment mechanisms so as to fix a relative motion between the baseplate and the vehicle, and so that the FOV of the at least one sensor is unoccluded while the vehicle is in operation.

4. The universal sensor assembly of claim 1, wherein the baseplate is configured to be calibrated to a calibration point based at least in part on the one or more surface parameters prior to being mounted onto the rooftop of the vehicle, and wherein the one or more surface parameters comprises a determined height, a determined width, a determined position, a determined angle, a determined shape, a determined contour, or a determined style of the rooftop of the vehicle.

5. The universal sensor assembly of claim 1, wherein the set of detachable attachment mechanisms comprises one or more vacuum pump suction cups, one or more magnetic devices, one or more Velcro fasteners, or one or more adhesive materials.

6. The universal sensor assembly of claim 1, wherein the at least one support component comprises at least one conical-shaped rigid support component configured to increase in rigidity over a surface area thereof.

7. The universal sensor assembly of claim 1, wherein the support structure further comprises:
   one or more removable support structures including a first end being detachably mounted to the baseplate and a second end for detachably mounting to the rooftop of the vehicle or at least one of the set of detachable attachment mechanisms, and wherein the one or more removable support structures are selected and positioned based at least in part on the one or more surface parameters associated with the rooftop of the vehicle.

8. A method of providing a universal sensor assembly for mounting on a vehicle, the method comprising:
   determining one or more surface parameters associated with a surface of the vehicle;
   determining a set of detachable attachment mechanisms and a set of support components configured to support a baseplate of the universal sensor assembly, the baseplate supporting at least one sensor for detecting an environment external to the vehicle and being configured to provide a common coordinate frame by which a sensor calibration of the least one sensor is to be performed based thereon, wherein the set of detachable attachment mechanisms and the set of support components are determined based at least in part on the one or more surface parameters associated with the surface of the vehicle;
   mounting the baseplate to the set of detachable attachment mechanisms and the set of support components to form the universal sensor assembly; and
   mounting the universal sensor assembly to the surface of the vehicle.

9. The method of claim 8, wherein the surface of the vehicle is a rooftop of the vehicle, and wherein the one or more surface parameters associated with the surface of the vehicle include a height, a width, a position, an angle, a shape, a contour, or a style of the rooftop of the vehicle.

10. The method of claim 8, wherein the set of detachable attachment mechanisms is mounted to an undersurface of the baseplate, and wherein the set of detachable attachment mechanisms is configured to compress while mounting the universal sensor assembly to the surface of the vehicle.

11. The method of claim 10, wherein the set of support components is mounted to an inner portion of the undersurface of the baseplate, and wherein the set of support components is configured to at least partially counteract the compression by the set of detachable attachment mechanisms so as to fix a relative motion between the baseplate and the vehicle.

12. The method of claim 8, wherein the set of support components comprises one or more conical-shaped rigid support components configured to increase in rigidity over a surface area thereof.

13. The method of claim 8, further comprising:
   determining one or more removable support structures, the one or more removable support structures including a first end for detachably mounting to the baseplate and a second end for detachably mounting to the rooftop of the vehicle or at least one of the set of detachable attachment mechanisms, and wherein the one or more removable support structures are determined based at least in part on the one or more surface parameters associated with the vehicle.

14. The method of claim 13, wherein determining the one or more removable support structures comprises selecting the one or more removable support structures from a library of removable support structures based at least in part on the one or more surface parameters.

15. A universal sensor assembly configured for mounting on a vehicle, the universal sensor assembly comprising:
   a sensor suite, comprising:
      a baseplate configured to provide a common coordinate frame by which a sensor calibration is to be performed based thereon; and at least one sensor being supported by the baseplate and calibrated based on the common coordinate frame, the at least one sensor including a field of view (FOV) for perceiving one or more objects within an environment surrounding the vehicle;

a set of detachable attachment mechanisms secured to the vehicle and supporting the baseplate; and a set of support components supporting the baseplate, wherein the set of support components is capable of at least partially counteracting a compression exerted by the set of detachable attachment mechanisms against the set of support components while the vehicle is moving so as to fix a relative motion between the baseplate and the vehicle and prevent occlusion of the FOV of the at least one sensor to the one or more objects within the environment.

16. The universal sensor assembly of claim 15, wherein the set of detachable attachment mechanisms is mounted to an outer portion of an undersurface of the baseplate, and wherein the set of support components is mounted to an inner portion of the undersurface of the baseplate.

17. The universal sensor assembly of claim 16, wherein a position of the set of detachable attachment mechanisms on a rooftop of the vehicle is determined based at least in part on one or more surface parameters associated with a rooftop of the vehicle, and wherein the one or more surface parameters comprises a determined height, a determined width, a determined position, a determined angle, a determined shape, a determined contour, or a determined style of the rooftop of the vehicle.

18. The universal sensor assembly of claim 17, further comprising:

one or more removable support structures including a first end being detachably mounted to the baseplate and a second end for detachably mounting to the rooftop of the vehicle or at least one of the set of detachable attachment mechanisms, and wherein the one or more removable support structures are selected and positioned based at least in part on the one or more surface parameters associated with the rooftop of the vehicle.

19. The universal sensor assembly of claim 15, wherein the set of support components comprises a high-density rubber material, a high-density foam material, a high-density fiber material, a high-density polymer material, a high-density ceramic material, a high-density composite material, or a high-density alloy material.

20. The universal sensor assembly of claim 15, wherein the set of support components comprises a greater Flexural modulus of elasticity as compared to the set of detachable attachment mechanisms or a greater Tensile modulus of elasticity as compared to the set of detachable attachment mechanisms.

* * * * *